Dec. 29, 1925.
F. A. HART
1,567,590
TYPEWRITING AND LIKE MACHINE
Filed Feb. 6, 1925
9 Sheets-Sheet 1
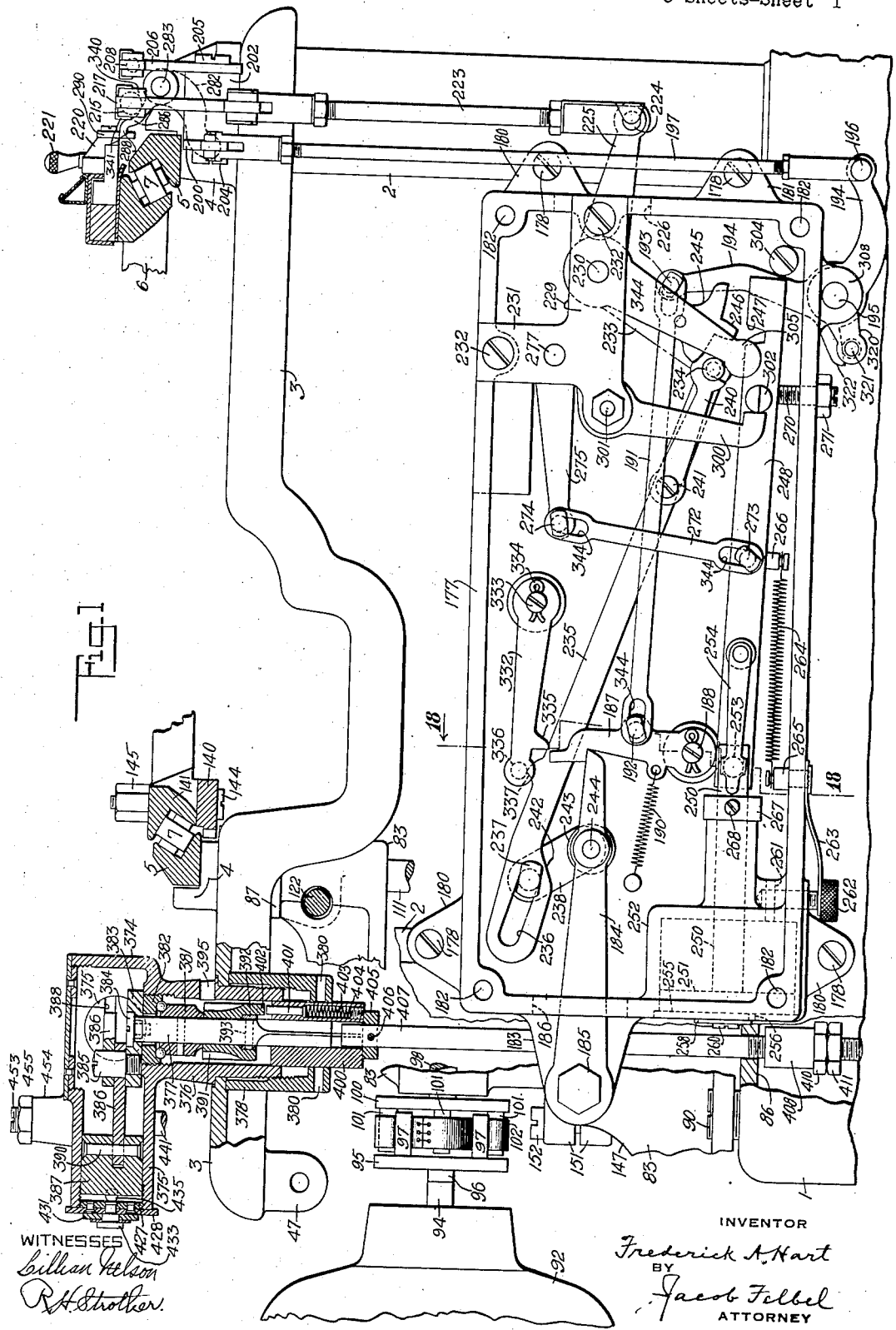

Dec. 29, 1925.
F. A. HART
1,567,590
TYPEWRITING AND LIKE MACHINE
Filed Feb. 6, 1925
9 Sheets-Sheet 2
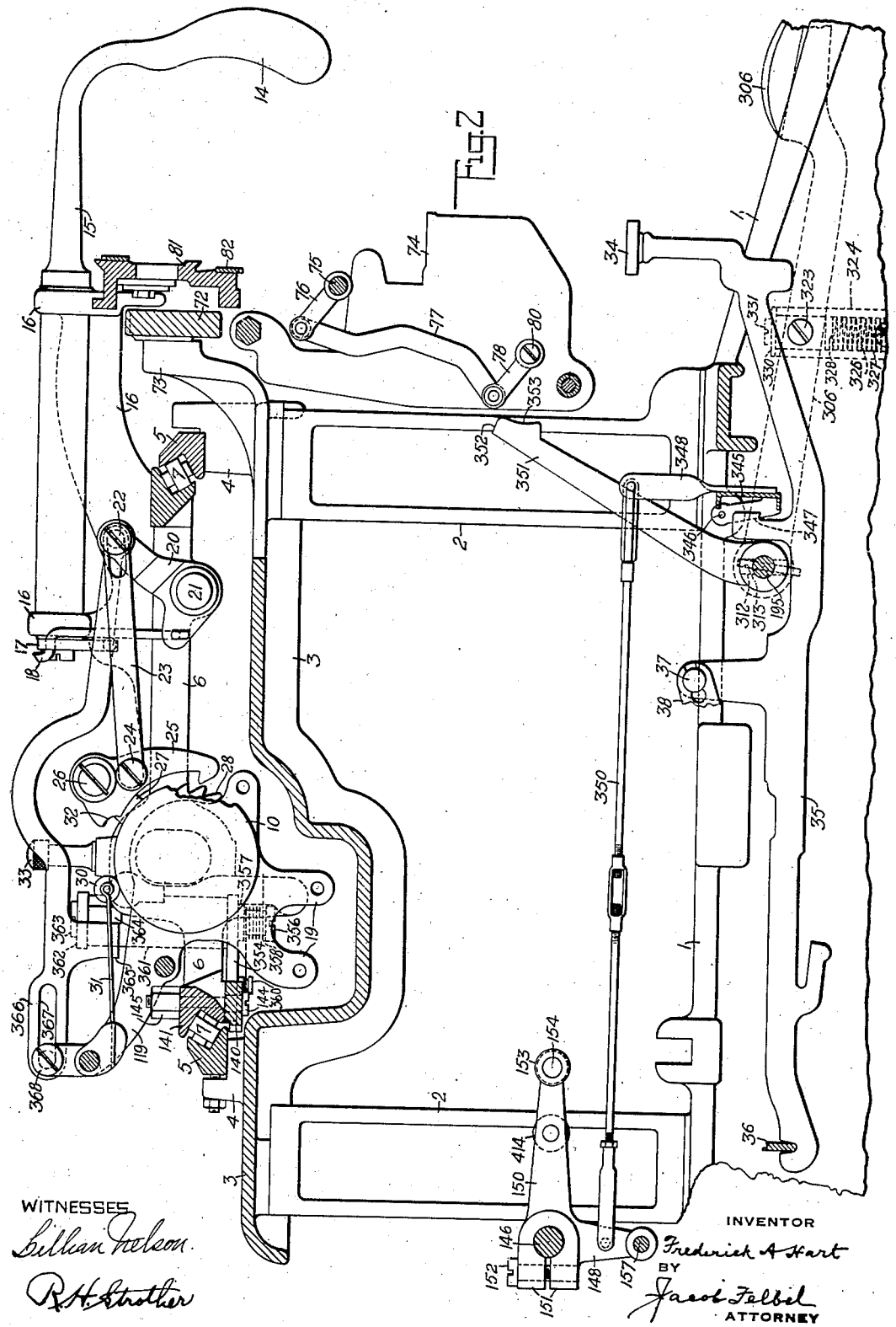

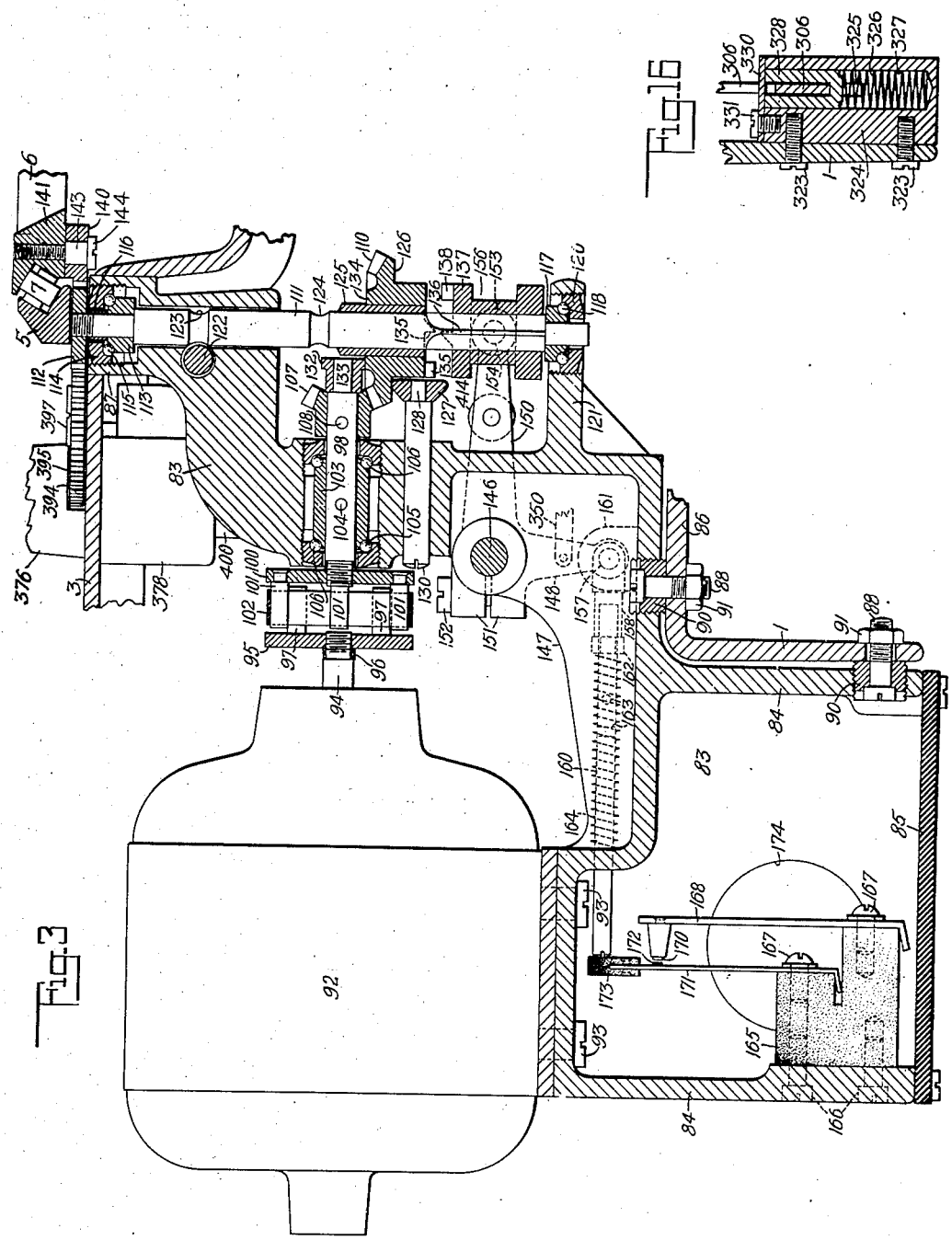

Dec. 29, 1925.
F. A. HART
1,567,590
TYPEWRITING AND LIKE MACHINE
Filed Feb. 6, 1925     9 Sheets-Sheet 4
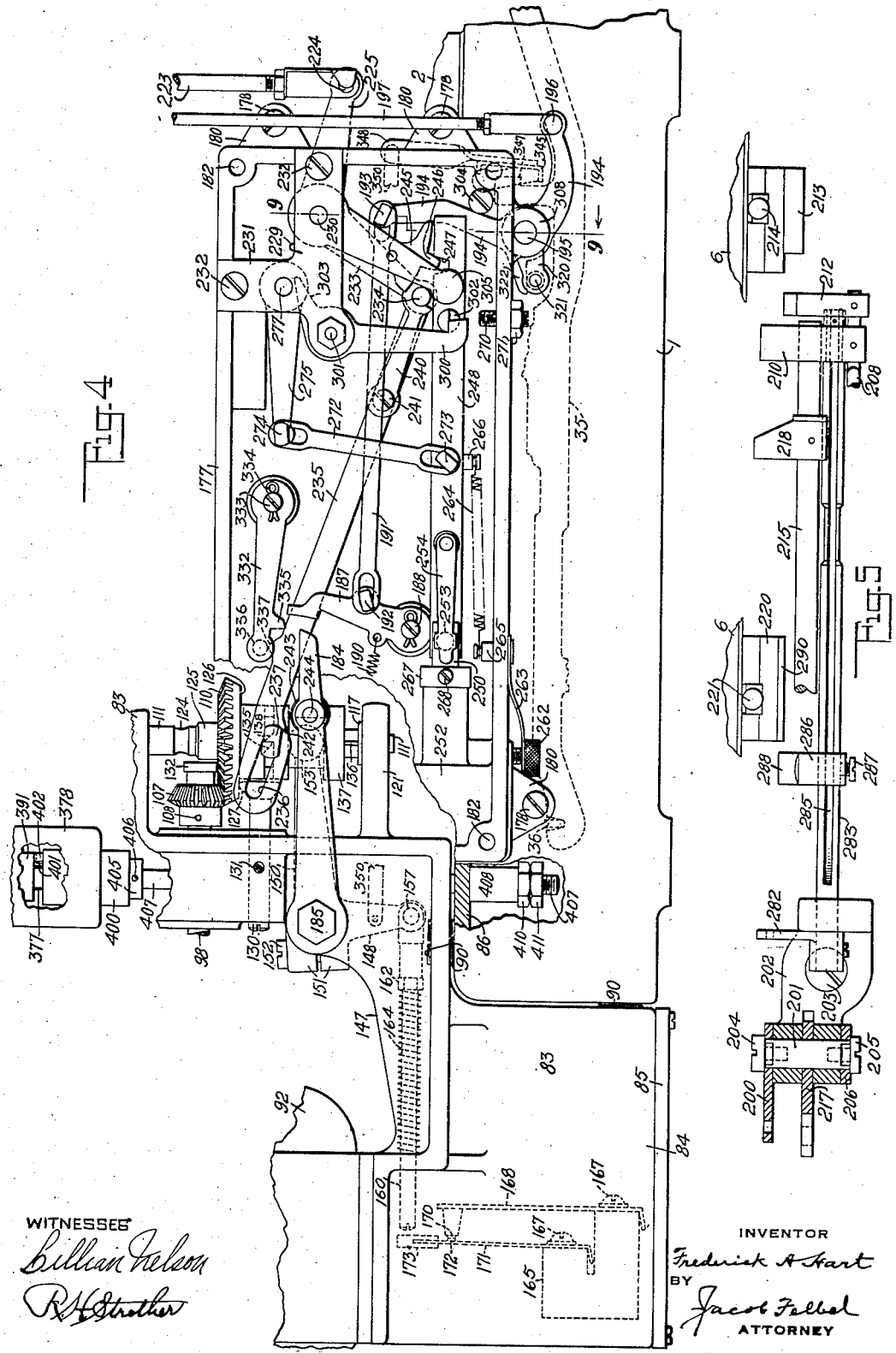
WITNESSES
Lillian Nelson
R H Strother
INVENTOR
Frederick A Hart
BY
Jacob Felbel
ATTORNEY Dec. 29, 1925
F. A. HART
1,567,590
TYPEWRITING AND LIKE MACHINE
Filed Feb. 6, 1925      9 Sheets-Sheet 5
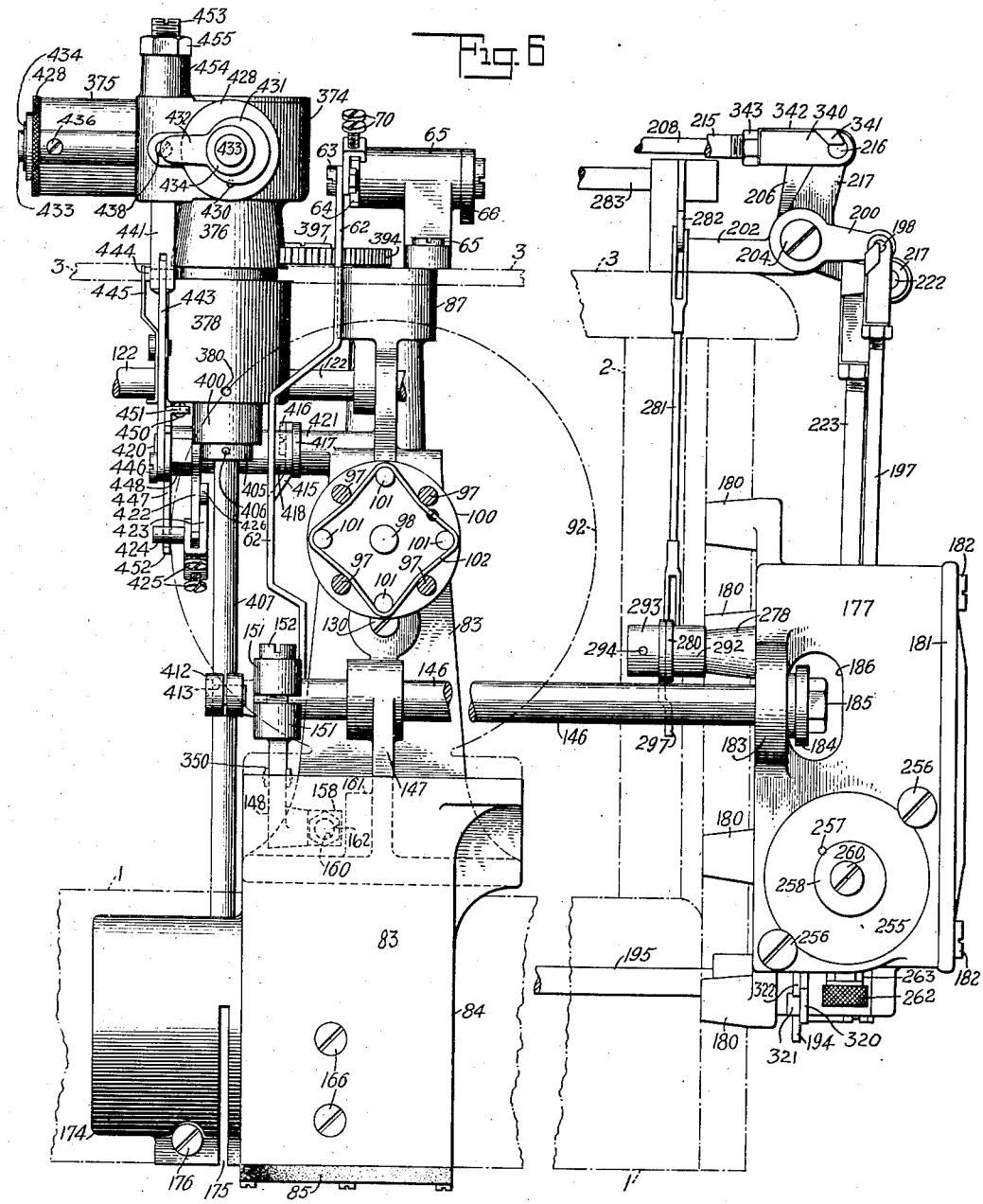
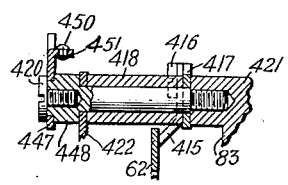

Dec. 29, 1925.
F. A. HART
1,567,590
TYPEWRITING AND LIKE MACHINE
Filed Feb. 6, 1925      9 Sheets-Sheet 6
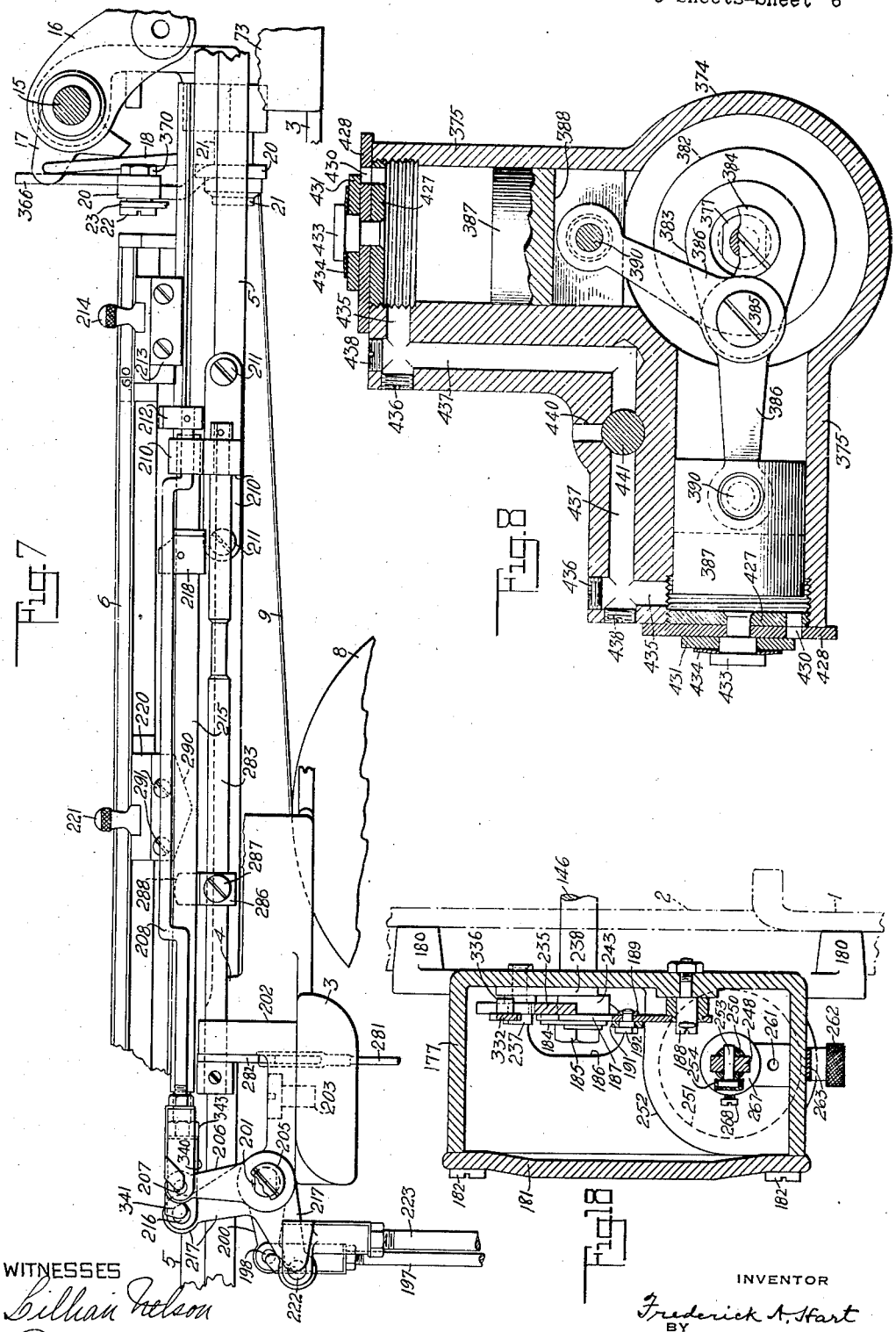
WITNESSES
Lillian Nelson
R H Strother
INVENTOR
Frederick A. Hart
BY
Jacob Felbel
ATTORNEY Dec. 29, 1925.
F. A. HART
1,567,590
TYPEWRITING AND LIKE MACHINE
Filed Feb. 6, 1925
9 Sheets-Sheet 7
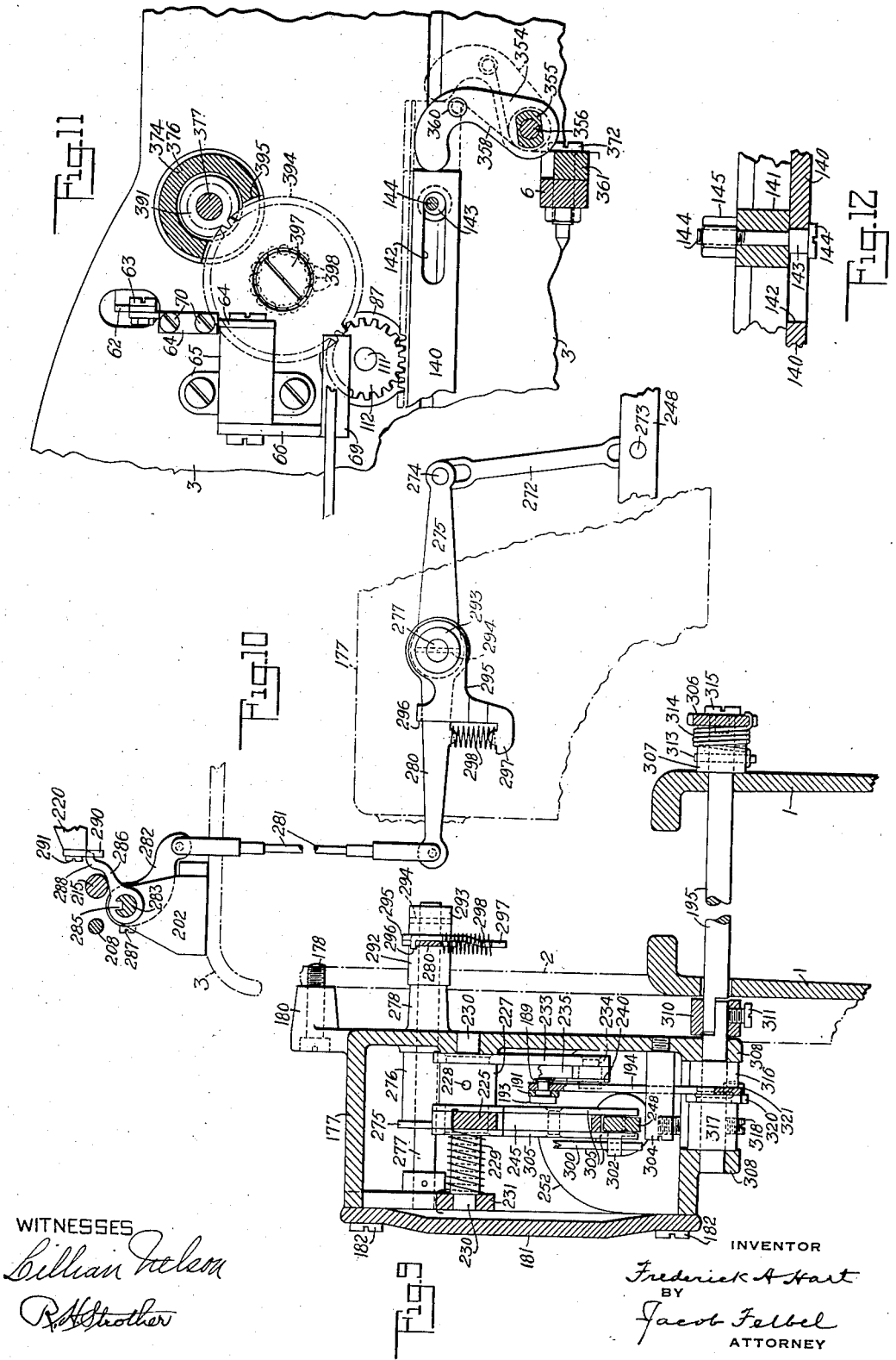

Dec. 29, 1925.  
F. A. HART  
1,567,590  
TYPEWRITING AND LIKE MACHINE  
Filed Feb. 6, 1925  9 Sheets-Sheet 8
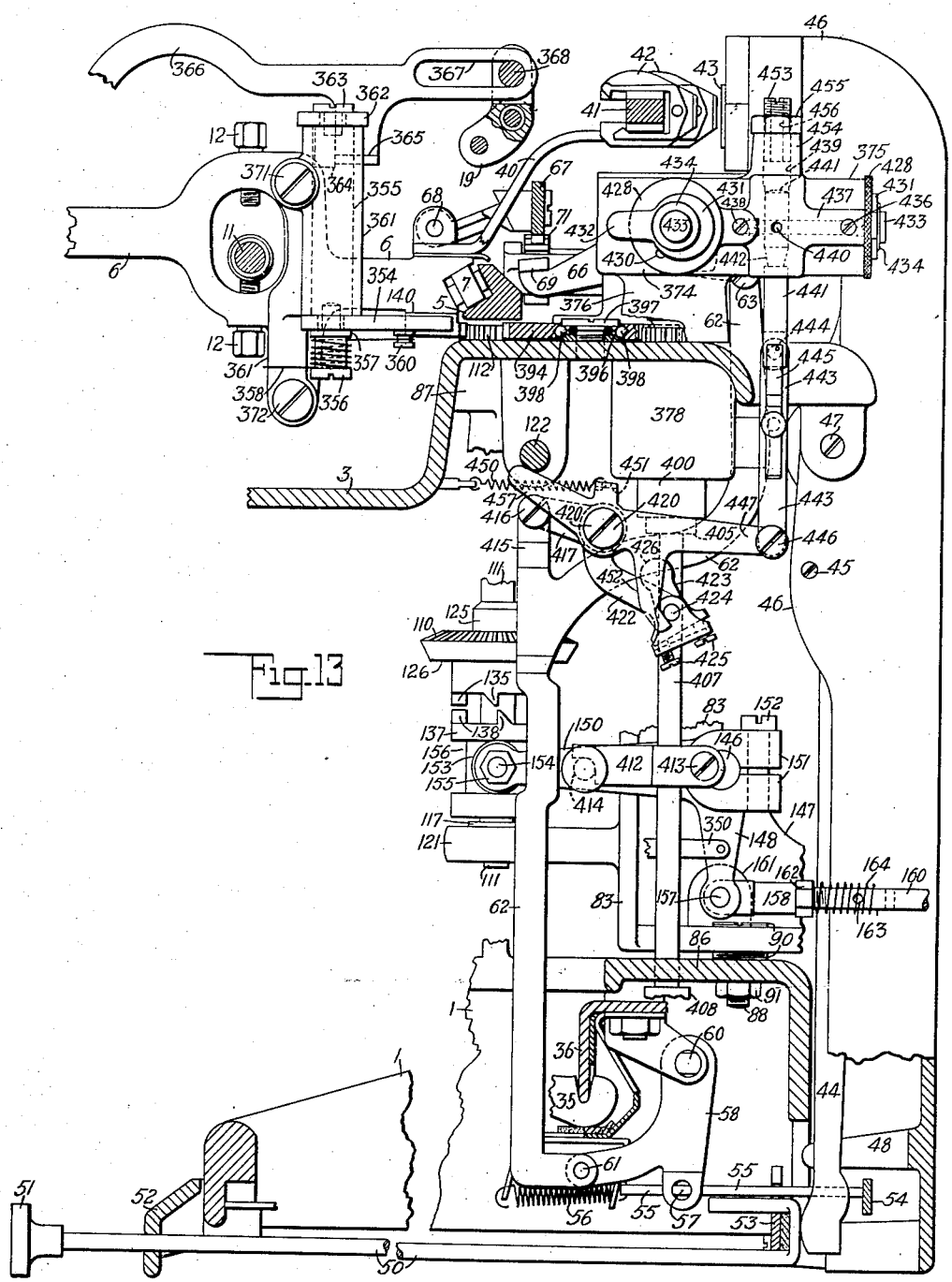

Dec. 29, 1925.
F. A. HART
1,567,590
TYPEWRITING AND LIKE MACHINE
Filed Feb. 6, 1925     9 Sheets-Sheet 9
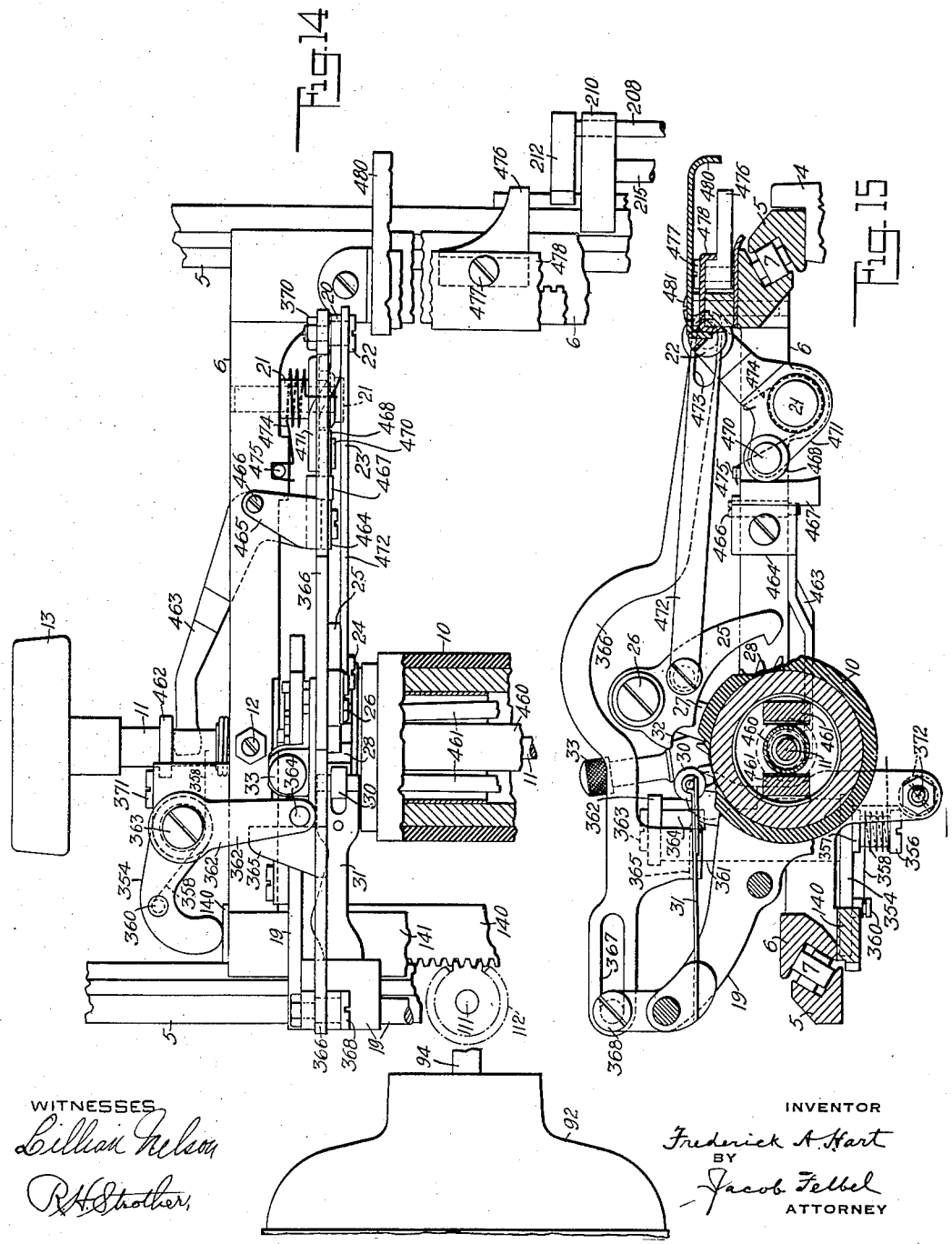

Patented Dec. 29, 1925.

1,567,590

UNITED STATES PATENT OFFICE.

FREDERICK A. HART, OF NEW BRITAIN, CONNECTICUT, ASSIGNOR TO REMINGTON TYPEWRITER COMPANY, OF ILION, NEW YORK, A CORPORATION OF NEW YORK.

TYPEWRITING AND LIKE MACHINE.

Application filed February 6, 1925. Serial No. 7,213.

*To all whom it may concern:*

Be it known that I, FREDERICK A. HART, citizen of the United States, and resident of New Britain, in the county of Hartford and State of Connecticut, have invented certain new and useful Improvements in Typewriting and like Machines, of which the following is a specification.

My invention relates primarily to typewriting machines although it is applicable or adaptable in some of its features to other machines, such as listing adding machines.

My invention has for its principal object to provide improved mechanism for restoring the carriage of a typewriting machine to its right-hand or initial position by the power of a motor, but the same motor also preferably operates the line space or paper feed mechanism of the machine.

My invention includes various improvements in mechanism of the sort above indicated, said improvements being with a view to making the mechanism thoroughly practical and efficient; to making it convenient and reliable in operation; to make the mechanism so that it is easily assembled and disassembled; to effecting the carriage return quickly but without severe jars and shocks and to improving mechanism of this character in various ways. My mechanism is so designed that it can be added somewhat in the nature of an attachment to typewriters as at present manufactured.

An electric motor is geared to a rack bar on the typewriter carriage through clutch mechanism which can be closed either automatically by the leftward travel of the carriage or manually by a key, said automatic and manual means each serving also to close the circuit through the motor. The rack bar mentioned is slidable on the carriage so as to operate the line space mechanism. The carriage in its rightward travel under the drive of the motor is checked by a dashpot and one of the features of my invention resides in means whereby this dashpot is brought into operation when the carriage is drawn back for a sufficient distance for the motor to acquire its full speed but is not brought into use when the carriage has traveled only a little toward the left from its initial position.

I have also provided an improved retarder or governor for the carriage return mechanism. Typewriters are usually equipped with tabulator mechanism for imparting to the carriage a free run toward the left until it is arrested by the tabulator stops, and this free run of the carriage is usually regulated by a governor. I use the same governor for the tabulator as for my electric motor, but as the motor has a great deal more power than the carriage spring, I have so contrived the governor that the amount of resistance it offers to the run of the carriage is automatically changed, so as to offer more resistance when it is used in conjunction with the motor than when it is used in conjunction with the carriage spring and tabulator.

In case a computing attachment is mounted on the typewriter as is frequently done, I provide an interlock between said computing attachment and the carriage return key so that said carriage return key cannot be operated while the computing attachment is in operation, and, vice versa, the computing attachment cannot be operated while the carriage return key is depressed. Means are also provided for locking the printing keys of the typewriter while the carriage is being returned to initial position by the motor. The rotary paper cylinders or platens of typewriting machines are sometimes provided with a releasable clutch and in some instances it is desirable to have this clutch operated by the carriage return motor as will be explained in detail hereinafter and my invention includes means for doing that where it is desirable.

To the above and other ends my invention consists in certain features of construction and combinations and arrangements of parts all of which will be fully set forth herein and particularly pointed out in the claims.

One form of my invention is illustrated in the accompanying drawings in which—

Figure 1 is a fragmentary left-hand side view of a typewriting machine having my invention embodied therein, some parts being shown in section.

Figure 2 is a front to rear vertical sectional view of the machine, with much of the mechanism omitted. In this view is shown among other things a part of a computing attachment and the interlock between said attachment and the carriage return key.

Figure 3 is a front to rear central sectional view of the mechanism for driving the carriage and the frame in which said mechanism is mounted together with some fragments of the typewriting machine.

Figure 4 is a left-hand side elevation on a smaller scale than Fig. 1 and fragmentary in character, showing some of the driving and governing mechanisms and showing some of the control mechanism in the position it occupies at the instant when the carriage return key has been depressed and before the motor has started.

Figure 5 is a fragmentary plan view, partly in section, of that portion of the control mechanism which is at the front of the typewriter carriage and is operated by said carriage.

Figure 6 is a rear elevation of a portion of my mechanism partly broken away and with the motor sectioned away so as to show the parts in front of it.

Figure 7 is a fragmentary front elevation showing parts of the control mechanism immediately associated with the typewriter carriage and showing also portions of the line spacing mechanism.

Figure 8 is an enlarged horizontal section of the governor taken centrally of the pneumatic cylinders.

Figure 9 is a fragmentary front elevation of some of the control mechanism in section on the line 9—9 of Fig. 4.

Figure 10 is a right-hand side elevation of some of the control mechanism.

Figure 11 is a plan view, with parts sectioned away, of the gearing and other devices which are situated just above the top plate of the typewriter.

Figure 12 is a sectional view of a detail.

Figure 13 is a fragmentary right-hand side elevation of the parts at the rear of the typewriter, with a number of parts in section and some broken away.

Figures 14 and 15 illustrate a slight modification of some of my mechanism with the addition thereto of means for operating the platen clutch. Fig. 14 is a plan view partly in section, and Fig. 15 a front to rear vertical section looking toward the right.

Figure 16 is a detail view of the carriage-return key lever and certain co-operating devices, in transverse vertical section.

Figure 17 is a transverse vertical section of a detail.

Figure 18 is a transverse vertical section through the control box on the line 18—18 of Fig. 1.

I have shown my invention applied to a form of the Remington typewriter which is sometimes called the "L Model," and which is substantially similar to the machine known commercially as the No. 12 Remington typewriter.

The main frame of this machine includes a base casting 1, corner posts 2, and a top plate 3. In Fig. 2 the right-hand front corner post and top plate are shown of a modified form to accommodate the Wahl computing mechanism, this modified form of framing being fully shown and described in my prior application filed Sept. 12, 1924, Sr. No. 737,260. Lugs 4 on the top plate 3 support stationary carriage rails 5 on which the carriage truck 6 runs by means of roller bearings 7, said carriage being propelled in letter feed direction by the usual spring drum or motor 8 and strap 9 conventionally shown in Fig. 7. A paper roller on platen 10, Figs. 14 and 15, has its axle 11, Fig. 13, mounted in a shift frame 19, and shiftable up and down between stop screws 12 for upper and lower case. On the ends of the axle 11 are usually mounted finger wheels 13.

The usual line space mechanism for this type of machine, Figs. 2 and 7, includes a line space handle 14 bent off from a rock shaft 15 which is journaled in a bracket 16 mounted on the carriage, said shaft being provided with a returning spring not shown. At its rear end said shaft has an arm 17 which is connected by a wire link 18 with a bell crank 20, having a pivot 21 secured to the carriage truck 6. The upstanding arm of said bell crank has pivoted thereto at 22 a push link 23 which is pivoted at 24 to the feed dog 25. Said feed dog has a pivot 26 on an arm 27 which is mounted to rock about the axle 11 as a center. The dog 25 engages the teeth of a line space ratchet wheel 28, which teeth are also engaged by a detent roller 30 mounted on a spring arm 31. Said dog also has a concave edge 32 which when the line space mechanism is operated is adapted to engage the roller 30 to stop the motion of the dog and also to lock said dog and roller in the teeth of the wheel to prevent overthrow. An adjustable handle 33 is provided which can be set in three positions to cause the mechanism to turn the platen to the extent of one, two or three teeth of the ratchet wheel 28, as desired. This mechanism has been incompletely shown in the present drawings because it is well known in the art, being shown in certain patents and having been in use on the Remington typewriter for a number of years, and also because the details of construction of the line space mechanism are more or less immaterial as far as my invention is concerned.

The printing mechanism of the typewriter includes printing keys 34 mounted on key levers 35 which are pivoted at 36 and each of which key levers has a stud 37 engaging a slot in the horizontal arm of a bell crank 38. These bell cranks have upstanding arms which engage the heels of front strike type bars in the well known manner, these parts being not illustrated in the drawing.

A denominational tabulator is an ordinary part of the equipment of machines of this character, the one partially illustrated in Fig. 15 being that shown in the patent to Edwin E. Barney, No. 1,425,825, dated August 15, 1922. Brackets 40, mounted on the carriage truck 6, support a column stop bar 41 having mounted thereon column stops 42, each settable forward to an inoperative, and rearward to an operative, position. These column stops when in operative position can be arrested by denominational stops 43 when the latter are projected forward. The stops 43 consist of the upper ends of long vertical levers 44 which are pivoted at 45 in a frame 46 which frame is suitably secured to the top plate at 47 and by other means, not shown, to the base 1. At their lower ends the levers 44 are guided by a comb 48 and they are adapted to be operated by a series of push rods 50 each extending to and projecting from the front of the machine where it is provided with a push button 51. The rods 50 are guided at their front ends by a bracket 52 and at their rear ends by a comb plate 53. When any one of the levers 44 is operated by its key 51 it operates a universal bar 54 constituting part of a sliding frame 55 which is restored to its normal position by a spring 56. Said frame 55 is pivoted at 57 to a bell crank 58 suitably pivoted at 60 to a stationary part of the machine. Said bell crank is pivoted at 61 to a vertical link 62 which at its upper part is curved first rearward and then upward and is pivoted at 63, Figs. 11, 13 and 6, to one arm 64 of a lever which is pivoted in a bracket 65 secured to the top plate 3. This lever has another arm 66 having on its front end a shoe 69 which underlies the feed rack 67 of the typewriter, which feed rack is pivoted at 68 to the carriage truck 6. In Fig. 6 the lever arm 64 is shown of compound construction with certain adjusting screws 70 but this detail is immaterial as far as my invention is concerned.

The letter feed mechanism of the typewriter includes the feed rack 67, a feed pinion 71 and a train of escapement devices of ordinary construction including an escapement wheel connected with the pinion 71. The whole construction of the tabulator is such that when one of the keys 51 is operated one of the denominational stops 43 is projected into the path of one of the set column stops 42 and at the same time the lever 64, 66 lifts the feed rack 67 out of mesh with the feed pinions 71, allowing the carriage to run freely to the left driven by its main spring.

The Remington typewriter is sometimes equipped with the computing mechanism described in the patent to John C. Wahl, No. 1,270,471 dated June 25, 1918, and a fragment of this mechanism is indicated in Fig. 2, which is a section taken between the main actuator section of the Wahl mechanism and the right-hand section of that mechanism, which latter is devoted to the operation of cross footing. The main frame of the Wahl mechanism includes a casting 72 which is secured to the top plate 3 of the typewriter by brackets 73 rising from said top plate. In the Wahl patent referred to these brackets are sheet metal brackets fastened to the top plate but in the present instance I have shown them integral with said top plate, which top plate as well as the right hand front post 2 shown in Fig. 2 have the special form fully described in my application for Patent, Sr. No. 737,260, hereinbefore referred to. 74 represents the left-hand vertical frame plate of the right-hand cross footing section of the Wahl mechanism, and 75 a cross section of the rock shaft of the main or left-hand section of said Wahl mechanism, which rock shaft is a part of the device in the Wahl actuator, which performs the function of a universal bar for the numeral keys. Said universal bar is so arranged and connected that whenever any numeral key is depressed to operate the computing mechanism, this shaft 75 is rocked counterclockwise in Fig. 2. Said shaft has an arm 76 which is connected by a link 77 with an arm 78 mounted on the left-hand end of a rock shaft at 80, which rock shaft performs in the cross footer the same functions as the rock shaft 75 does in the main part of the actuator. The Wahl mechanism also includes a main truck 81 which is mounted on suitable supporting rollers and is operatively connected by the brackets 16 with the carriage truck 6 so as to travel right and left with said carriage. The computer truck 81 is adapted to have so-called vertical totalizers mounted thereon. Said truck has along its lower edge a toothed rack 82 with which when a numeral key is depressed co-operates a certain master dog which momentarily locks said rack and therefore the computer truck 81 and typewriter carriage 6. This is one of several reasons why it would cause damage if the electric carriage return mechanism were brought into operation simultaneously with the computing mechanism and why an interlock is provided between the two mechanisms as will hereinafter be described.

The carriage driving or power mechanism is preferably made as an attachable and detachable unit which is best shown in Figs. 3, 4 and 6 of the drawing. The frame of said unit preferably consists of a single casting which is designated generally by reference numeral 83. The lower rear part of said casting is a box-like structure 84 having front, rear and side walls and closed at the top but open at the bottom. The bottom may, however, be closed by a suitable piece 85 of fibre or other material fastened on with screws. The box 84 lies behind the vertical web of the base casting 1 of the typewriter and the casting 83 extends forward over the rear shelf 86, of said base casting 1. Above said shelf 86 the casting 83 extends upward, thence forward, and thence upward again terminating at its upper end in a cylindrical part 87 which is simply inserted without other fastening in a round hole bored for the purpose in the top plate 3 of the typewriter. The casting 83 is secured to the base 1 by means of several bolts 88, which pass through holes made for the purpose in base 1 and shelf 86 and through bushings 90 threaded through the casting 83. After the cylinder 87 has been inserted in the hole in the top plate these several bushings are screwed down until they contact with the base 1 in such fashion as to hold the casting in the desired position after which the bolts 88 are inserted and secured by nuts 91. Preferably there are two of these bolt and bushing combinations in the horizontal shelf 86 and one in the vertical web of the base casting. This entire unit can be very quickly detached by removing the three bolts 88 and simply withdrawing the casting from the hole in the top plate. The two bushings which rest on the shelf 86 provide for a vertical adjustment of the casting 83 to regulate the extent to which it passes into the hole in the top plate and, thereby, the engagement of the drive pinion with the carriage rack as will appear hereinafter.

The box 84 has a flat top on which any suitable electric motor 92 may be mounted and secured in position as by screws 93. This motor is very readily attachable and detachable by means of these screws, this being useful partly because some machines having much heavier carriages than others require a larger motor but chiefly because of difference in the current available in different offices.

In order further to facilitate the substitution of one motor for another without the necessity for any fine adjustment with relation to the mechanism driven by said motor, the motor shaft 94 is preferably connected with the train of gearing that leads to the carriage by means of a flexible and detachable coupling. Couplings of this general character and for this purpose have been devised in a variety of forms, but I find that form shown in the drawing convenient and efficient for my purposes. A disk 95 is fastened on the end of the armature shaft 94, in the present instance being screwed on to said shaft up against a collar 96 that engages a shoulder on the shaft. Said disk 95 has four pins 97 projecting forward therefrom, these pins being shown in section in Fig. 6. A horizontal drive shaft 98 has a similar disk 100 mounted on its rear end and having four pins 101 projecting rearward therefrom and a leather band 102 is woven in and out among the pins 97 and 101, as shown in Fig. 6. This band communicates the motion of the pins 97 to the pins 101 but is itself so flexible that exact alignment of the two shafts 94 and 98 is not necessary. The construction is such that the motor can be quickly set in place and coupled up to the drive shaft 98.

Said shaft 98 is preferably mounted in ball bearings. In the form here shown these comprise a sleeve 103 mounted on said shaft and secured to it by a pin 104, said sleeve having suitable annular concavities in its ends for the balls 105. These balls run in adjustable rings 106 screwed into a hole made for the purpose through the vertical part of the casting 83. The construction is such as not only to enable the ball bearings to be properly adjusted but also to enable a longitudinal adjustment of the shaft 98 to be made if necessary. The shaft 98 has a beveled pinion 107 secured thereon as by a pin 108, and said pinion is in continuous mesh with a beveled gear 110 loosely mounted on the vertical drive shaft 111, which at its upper end extends through the cylindrical part 87 of the casting and has a spur gear 112 mounted on it just above the top plate 3. The shaft 111 has at its upper end a ball bearing consisting of a collar 113 mounted on the reduced upper end of the shaft and seated against the shoulder thereof, a ring 114 screwed downward into the cylindrical part 87 of the casting 83 and balls 115 running between said collar and rings. A sleeve 116 rests on the collar 113 and the pinion 112 is screwed down against said sleeve, the screw threads being so disposed that rotation of the shaft 111 to drive the carriage toward the right tends to tighten the pinion on the shaft rather than to loosen it. At its lower end the shaft is journaled by a ball bearing including a collar 117 mounted on shaft 111, balls 118 and a ring 120 screwed upward through a bracket or shelf 121 projecting forward from the casting 83.

Preferably the round upper part of the casting 83 is of a little greater diameter than the pinion 112, so that the drive unit can be attached and detached while fully assembled, including said pinion. In other words, this pinion when in place on the shaft can be passed through the hole in the top plate.

The Remington typewriter has included in its back spacing mechanism a cross shaft 122 to accommodate which a hole has been made in the upper part of the casting 83 and an annular concavity 123 has been turned in the shaft 111. Another such concavity 124 is made in said shaft to avoid interference with the main drive shaft of the ribbon feeding mechanism of the typewriter. These are of course only small details necessitated by the particular construction of the machine to which my invention is here shown applied. The beveled gear 110 is loose on the shaft 111 so that said shaft can turn independently of the motor when the carriage travels either rearward or leftward without the use of the motor. I have here shown said gear provided with a bearing sleeve or bushing 125 which may be made of bronze and tightly inserted in the bore of the gear. In order to support and guide said gear against up and down motion it is formed with an annular horizontal plane undersurface 126 which when the gear rotates rides on a small wheel or roller 127 journaled on the eccentrically disposed reduced end 128 of a rod or pin 130 inserted through a suitable hole in the casting 83 and secured in place by a set screw 131, Fig. 4. Upward motion of the gear 110 is prevented by another small wheel or roller 132 journaled on the reduced end 133 of the shaft 98 and riding on a flat annular part 134 of the gear 110. This wheel 132 being concentric with the pinion 107 is made of such diameter as to allow the two beveled gears to mesh properly. The lower wheel 127 can be adjusted up and down by turning the rod 130, the rear end of which is made with a screw-driver slot for the purpose, the eccentricity of the bearing 128 enabling the adjustment to be made. The adjustment when it is made is secured by tightening the set screw 131.

In order to connect the gear 110 with and disconnect it from the shaft 111, a clutch is provided, the hub of the gear itself constituting the upper member thereof, being provided with depending clutch teeth 135. The lower part of the shaft between the gear 110 and the ball bearing collar 117 is squared as indicated at 136 and on this squared part of the shaft is slidably mounted the lower clutch member 137 having teeth 138 adapted to engage the teeth 135. The means for controlling this clutch will be described hereinafter.

The spur gear or pinion 112 meshes with the teeth of a long rack bar 140 mounted on the rear rail 141 of the typewriter carriage truck 6. Said rack bar lies flat against the lower surface of said carriage rail and it is secured in position by means best shown in Figs. 11 and 12. At two or more places in its length the rack bar 140 is made with longitudinal slots 142 in each of which lies the cylindrical part 143 of a shouldered and headed bolt 144 which bolt passes through the carriage rail 141 and has a nut 145 screwed on to its upper end. The bearing cylinder 143 is of a length up and down slightly greater than the thickness of the rack bar 140 so that when the nut 145 is tightened and the bolt thus secured in position the rack bar will have freedom to slide longitudinally. The reduced part of the bolt which passes loosely through the carriage rail and is threaded through the nut 145, is eccentric to the bearing part 143 and the head of said bolt, which last is made with a screw-driver slot. The eccentricity of the bearing 143 is for the purpose of adjusting the rack front and back, this being desirable because of the fact that the stationary carriage rails 5 are themselves adjustable in that direction, and it is desirable to make a compensating adjustment of the rack bar so as to make the latter mesh properly with the pinion 112. The slots 142 are for the purpose of allowing to the rack bar a limited extent of movement independent of the typewriter carriage to effect line spacing by mechanism which will be described hereinafter.

The power unit above described is preferably located just to the right of that middle part of the typewriter which is occupied by the escapement mechanism and by the frame 46 of the tabulator stop mechanism.

The means for controlling the power unit comprises a transverse rock shaft 146, Figs. 3 and 6, which near its right-hand end is journaled in a lug of the web 147 of the casting 83 and which extends thence to the left-hand side of the machine where it is journaled in and controlled by devices to be presently described. At its right end said shaft has rigidly mounted thereon two lever arms 148 and 150, the first extending downward and the second horizontally forward from the shaft. These are here shown made as an integral bell crank with a split hub 151 which by means of a screw 152 can be tightened on the shaft 146. The horizontal arm 150 carries at its front end an antifriction roller 153, Fig. 13, journaled on a headed stud 154 secured to the arm by a nut 155. The roller 153 runs in an annular groove 156 in the lower clutch member 137. The construction is such that the engagement and disengagement of the clutch members is effected by rocking the shaft 146.

The depending arm 148, Figs. 3, 4, 6 and 13, has on its lower end a hub from which a stud 157 projects into the end piece 158 of a push rod 160 which extends rearward through the wall of the box 84 and terminates inside of said box. A lug 161 cast on the left-hand face of the web 147 of the casting 83, is so situated as to prevent the piece 158 from slipping off the stud. The rod 160 is screwed into the piece 158 so as to make said rod in effect adjustable as to its length and a lock nut 162 secures the adjustment.

Holes 163 through said rod may be provided for turning it. A spring 164 surrounds the rod 160 and is compressed between the nut 162 and the wall of the box 84. This is the controlling spring for the rock shaft 146, its power being exerted with a tendency to throw the clutch member 137 upward into engagement with the gear 110. The shaft is controlled by a latch which will be hereinafter described, which normally maintains the parts in the position shown in Fig. 3, where the clutch members are out of engagement.

The circuit closer for the motor 92 is located inside the box 84 and is controlled by the rod 160. A block 165 of insulating material, such as fiber, is fastened to the rear wall of box 84 by two screws 166, and secured to said block by means of screws 167 are an upstanding conductor 168 having a contact point 170 and another upstanding conductor 171 of spring metal and having a cooperating contact 172. On the upper end of the spring conductor 171 is mounted a block 173 of insulating material against which the end of the rod 160 normally presses to hold the contacts apart; but when the latch above referred to is released the resiliency of the piece 171 causes said contacts to come together as shown in Fig. 4 before the clutch members come into engagement.

If the circuit were not closed through the contacts before the clutch members came into engagement it might happen that a tooth 138 stood exactly under a tooth 135 so that the parts would be arrested. If, however, the circuit has already been closed by that time and the motor started, the upper clutch member will begin to rotate and the lower member can then move up to clutching position.

The box 84 may be provided with any suitable means for conducting the current, usually the house current, to the conductors 168 and 171 and to the motor 92. In Figs. 3 and 6 is shown a cylindrical projection 174 having a slot 175 sawed about half-way through it cross-wise and another slot lengthwise of it at the bottom and a tightening screw 176 for securing in position the fixed part of any suitable plug for connecting with the usual house wiring. The circuit may include a suitable condenser to prevent sparking when the circuit is broken.

A considerable part of the control mechanism is comprised in an attachable and detachable unit enclosed in what may be termed the control box 177, Figs. 1, 4, 6 and 9. Said box in the present instance is secured by screws 178 to the left-hand side of the typewriter frame, said screws passing through lugs 180 cast integral with the box. These lugs are prolonged rightward as shown in Fig. 6 to form short posts which rest against the base 1 and corner posts 2 into which the screws 178 are threaded. I have shown four of these posts and screws in the present instance but probably three would be better, two at the rear end and one in front. The box 177 is preferably cast with its bottom toward the right, its left-hand side being closed by a cover 181 secured to it by screws at 182. The right-hand end of shaft 146 is journaled in an ear 183 cast integral with the box 177 and it has a lever arm 184 mounted thereon and secured thereto by a screw 185, said arm projecting through a hole 186 in the rear wall of the box. The front end of the arm 184 is normally engaged by a latch 187 which is pivoted on a stud 188 riveted into the right-hand wall of the box 177 and drawn into engaging position by a spring 190. As shown in Fig. 18 the stud 188 has a reduced part passing through the wall of the box and, preferably, through a washer 189 and with its end riveted up; and this reduced part is eccentric to the body of the stud. Said stud at its outer end has a screw-driver slot as shown in Fig. 1. The construction is such that after the stud has been riveted up it can, by the exertion of some force by a screw-driver, be turned and thus impart to the latch 187 a fine adjustment up and down in order to make it hold the arm 184 in the right position. It will be recalled that the shaft 146 and therefore the arm 184 are under the influence of the spring 164 which tends to rock the arm 184 upward, and this spring is resisted by the latch 187. The mechanism is set into operation to return the carriage by pulling this latch out of engagement with the arm. This is done through a link 191 pivoted to a headed pin 192 on the latch 187 and at its forward end pivoted on a headed pin 193 projecting from the upper end of a bell crank 194 which is pivoted on a shaft 195 beneath the box 177, the vertical arm of the bell crank coming up through a suitable hole in the box. The horizontal arm of the bell crank 194 is pivoted at 196 to a vertical link 197 which at its upper end is pivoted as best shown in Fig. 6 by a pin 198 to a lever arm 200 projecting leftward from a short rock shaft 201, Fig. 5, which rock shaft takes a bearing in a bracket or casting 202 secured by a screw 203 on top of the top plate 3 of the typewriter. The arm 200 is secured to the shaft by a screw 204 and at the forward end of said shaft another screw 205 secures to said shaft an upstanding arm 206, the arms 200 and 206 constituting in effect a bell crank. Said arm 206 is pivoted by means of a pin 207 to a horizontal push rod 208 which extends across the typewriter in front of the carriage and has its right-hand end slidably mounted in a bracket 210 which, Fig. 7, is secured by screws 211 to the front stationary rail 5 at about the middle of the machine. The rod 208 is here shown with an off-set section to avoid interference with a certain part of the Wahl mechanism. Said rod has an arm or abutment 212 mounted on its right-hand end and normally standing as shown in Fig. 7 a short distance to the right of the bracket 210. This arm or abutment is adapted to be struck by the left-hand face of a margin stop 213 which is secured to the front rail or cross bar of the typewriter carriage 6 along which rail or cross bar the margin stop can be adjusted by the manipulation of the finger piece 214. This adjustable margin stop is the one commonly employed in Remington typewriters, although its abutting surface may be modified if necessary for co-operation with the arm 212. The whole construction is such that the end of the line of writing can be determined by suitable adjustment of the margin stop 213 and in the last step of the carriage said margin stop engaging arm 212 will push the rod 208 toward the left, which will result in pushing the link 197 downward and rocking clockwise in Figs. 1 and 4, the bell crank 194 thus releasing the latch 187 as shown in Fig. 4. In said Fig. 4 the parts are shown at the instant of the release of this latch, the arms 150 and 184 have moved upward and the arm 148 has moved forward, the rod 160 has allowed the contact 172 to contact with 170, and the clutch members have been thrown into engagement by the arm 150. Under these conditions the motor immediately starts and begins to pull the carriage back toward the right, thus withdrawing the margin stop 213 from the arm 212 so that as soon as the carriage reaches its right-hand position and the shaft 146 has been rocked to break the clutch and the circuit, said latch 187 will be ready to snap over the arm 184 and retain the parts in their normal position.

The mechanism for arresting the carriage and opening the clutch and circuit comprises devices at the front of the typewriter shown in Figs. 1, 4, 5, 6 and 7. A rod 215 has its right-hand end slidably mounted in the bracket 210 and its left-hand end is pivoted by a pin 216 to the upper arm of a bell crank 217, which bell crank is mounted as best shown in Fig. 5 in a slot cut in the bracket 202 and is pivoted on the shaft 201. Rigidly mounted on the rod 215 is an arm or abutment 218 which normally stands in the position shown in Figs. 5 and 7, a suitable distance (something like one-half inch in the present instance) to the left of the bracket 210, which bracket serves as a stop to arrest said arm and the rod on which it is mounted. This arm when the carriage approaches the end of its return movement is struck by a margin stop 220 which by means of a hand-piece 221 is adjustable along the front bar of the typewriter carriage 6. Stop 220 is in the present instance the ordinary margin stop used in the Remington typewriter with its engaging part suitably modified for co-operation with the arm 218. It can be adjusted as usual so as to arrest the carriage at any desired position.

The horizontal arm of the bell crank 217 is pivoted by means of a pin 222 to the upper end of a link or pull rod 223 which at its lower end is by a pin 224 pivoted to a lever arm 225 projecting forward through a hole 226 in the front wall of the control box 177. Inside said control box 177, as best shown in Fig. 9, the arm 225 is rigidly mounted on the left end of a hub 227 which hub is as by a pin 228 rigidly mounted on a shaft 230, said shaft being journaled at its right-hand end in the wall of the box 177 and at its left-hand end in a bracket piece 231 which, Fig. 1, is of an angular outline, two of its ends being set into mortises in the side walls of the box 177 and secured in place by screws 232. A returning spring 229 coiled about the shaft 230 tends to rotate said shaft and the parts thereon so as normally to keep the rod 215 in its left-hand position shown in the drawings. As shown in Fig. 9, the hub 227 has fixed on its right-hand end a lever arm 233 normally extending downward and rearward as shown in Fig. 1. At its lower end the arm 233 carries a stud 234 to which is pivoted the forward end of a pull bar 235 which bar extends rearward and upward, its rear end having in it a slot 236 which rides on a headed stud 237 riveted into a lug 238 of the wall of the box 177. In order to retain the bar 235 on the stud 234, said stud has a peripheral groove cut in it over which fits a retaining plate 240 pivoted to the bar at 241 and having an opened slot adapted to be turned down into said peripheral groove. The whole construction is such that in the last part of the return motion of the carriage the rod 215 is forced toward the right, the link 223 and arm 225 are pulled upward, and the bar 235 is pulled forward at a downward inclination.

The bar 235 near its rear end is formed with a cam or incline 242 which, as will be understood by comparing Figs. 1 and 4, is adapted when the bar is drawn forward to act on a wheel or roller 243 journaled on a stud 244 projecting from the side of the lever arm 184, so as to depress said lever arm and thus restore it to its normal position where it is immediately retained by the latch 187. The roller 243 is simply placed on the stud by an endwise motion, and, when the parts are assembled, it is prevented from coming off by the lug 238 which is prolonged and finished for this purpose. Preferably the incline 242 is so designed as to cam down the roller 243 before the return motion of the carriage is quite completed, the lower edge of the bar 235 behind said incline serving as a dwell to maintain the roller in its depressed position during the additional run of the carriage, which additional run is effected by momentum.

In order to cushion the arrest of the carriage the pull rod 215 may be made to operate a suitable shock absorber, that shown being a dash-pot. To this end the lever arm 225 is made as one arm of a bell crank which also has a depending arm 245, Figs. 1, 4 and 9. This arm terminates in a tooth 246 resembling a gear tooth, which is adapted to engage as shown in Fig. 4 in a notch 247 in a pull bar 248, which is connected with the piston rod 250 of a piston 251 working in a dash-pot 252 cast integral with the control box 177 at its lower rear corner. The bar 248 shown is of rectangular cross section, and it enters a diametrical slot in the end of the round piston rod 250 where it is pivoted on a headed pin 253 which is retained in place by ears bent rightward from a spring retainer 254 pivoted to the side of the bar 248. The cylinder of the dash-pot is bored out from the rear end of the box and is closed by a cover plate 255, Figs. 1 and 6, which may be seated in an annular enlargement of the cylinder and retained in place by the heads of screws 256.

This cover plate may be provided with a vent-hole 257. A circular disk 258 pivoted on a screw 260 passing eccentrically through said disk, is so disposed that when said disk is turned to one position the hole 257 is left entirely open and if said disk be turned through 180 degrees said hole would be entirely closed, and any intermediate degree of covering up of the hole can be secured by suitably turning this disk which will be retained in adjusted position by the screw 260. This hole affords a suction vent and a compression vent may also be provided at the front end of the cylinder. In the form here shown, Fig. 1, a hole 261 is drilled horizontally through the end of the cylinder and through a lug of the casting and a screw 262 with a milled head is threaded from beneath the box through a vertical hole so that it can be adjusted up and down to close the hole 261 to any desired extent. I have shown the head of this screw acted on by the forked end of a flat spring 263 to frictionally hold it in adjusted position. The piston is normally retained in the rear end of the cylinder by means of a spring 264 connected at one end to a fixed stud 265 and at the other end to a stud 266 projecting from the bottom of the bar 248. By means of the disk 258 and screw 262 any desired degree of resistance can be obtained from the dash-pot. A collar 267 is secured to the piston rod 250 by a set screw 268 so as to arrest the parts; and this collar can be adjusted so as to bring notch 247 into register with tooth 246.

When the motor is first started it does not instantly acquire and communicate to the carriage the full velocity of which it is capable, and in case the carriage had been fed only a short distance toward the left the carriage would not have acquired its full velocity before the margin stop 220 struck the arm 218, and it might result that the resistance of the dash-pot would stop the carriage before said arm 218 had quite reached the bracket 210. It follows that whereas the dash-pot is extremely useful in runs of the carriage beyond a certain length, still in the case of short runs it might prevent the carriage from being fully restored to the desired position. One of the features of my invention therefore consists of means for causing the dash-pot to be brought into operation only by runs of the carriage beyond a certain length, shorter runs being made without the dash-pot being used at all. To this end I have so contrived that when the carriage is first restored to the right the bar 248 drops down to the position shown in Fig. 1 where it is disconnected from the tooth 246 and it remains in this position until the carriage has traveled the desired distance leftward when it is automatically drawn up to the position shown in Fig. 4 where it engages said tooth so that if at any time thereafter the motor be brought into operation the dash-pot will act, but if the motor be brought into operation before the carriage has traveled the desired distance then the arms 225 and 245 can rock without operating the dash-pot.

The bar 248 normally rests on the upper end of a stop screw 270 threaded through the bottom wall of the box 177 and adjustable from the outside of said box by turning it, the adjustment being secured by a lock nut 271. In order at the proper time to draw said bar 248 up into engagement with the tooth 246 a link 272 is pivoted at its lower end to a headed stud 273 on said bar and at its upper end to a stud 274 projecting from the rear end of a lever arm 275, Figs. 1, 4, 9 and 10. The arm 275 is rigid with a hub 276 which is fast on a rock shaft 277 which at its left end is journaled in the bracket piece 231 and at its right end projects through the wall of the box 177 and through a lug 278 cast on said box for the purpose, Figs. 6 and 9, the right-hand end of the shaft extending a short distance inside the typewriter frame where it has an arm 280 projecting forward therefrom as shown in Fig. 10, which is a view looking from the right. The free end of the arm 280 has pivoted thereto a link 281 which at its upper end is pivoted to an arm 282 which is fast on and projects rearward and downward from a rock shaft 283 which extends across the front of the typewriter parallel with the rods 208 and 215, as shown in Figs. 5 and 7, said rock shaft being journaled near its ends in the brackets 202 and 210. As shown, its right-hand end is reduced to take a bearing in the bracket 210 and provide a shoulder, and a small collar 284 is pinned on the end of the shaft to prevent motion thereof leftward. As shown in Figs. 5 and 10, the shaft 283 has a longitudinal groove 285 and in said groove is a spline in the hub of an arm 286 which projects rearward and upward from the rock shaft. This arm can be adjusted along said rock shaft right and left and secured by a set screw 287. Its upper end 288 is rounded for co-operation with a flat V-shaped cam 290 which is secured by screws 291 to the front face of the margin stop 220. The construction is such that when in the travel of the carriage the cam 290 runs over the end 288 of the arm 286 said arm is depressed, rocking the shaft 283 so as to push down on link 281 and pull up on link 272 and draw the bar 248 up to the position shown in Fig. 4. It will be noted that the arm 286 is adjustable lengthwise of the shaft 283 so as to vary the distance from the right hand end of the carriage travel at which this mechanism comes into action to elevate the bar 248.

Circumstances could arise such that the cam 290 might run over the arm 286 at a time when the notch 247 was out of register with the tooth 246, in which event the parts might be injured unless provision was made to prevent it. To this end, as best shown in Figs. 9 and 10, the arm 280 is not fast on the shaft 277 but has a hub 292 which is loosely mounted on said shaft between the lug 278 and another hub 293, which latter is fastened to the shaft by a pin 294. Said hub 293 has fast thereto and lying against the arm 280 an arm or plate 295 having an ear 296 bent off therefrom and lying over the top of the lever arm 280 so as to limit the relative motions of the plate and lever arm in one direction. The plate 295 has an arm formed with a horizontal part 297 and a spring 298 is compressed between this horizontal part and the lower edge of the lever arm 280, said spring being retained in place by ears of the parts as shown in Fig. 10. The construction is such that the motion of the lever arm 280 is communicated to the shaft 277 through the compression spring 298 so that in case the bar 248 is blocked against rising the spring can be further compressed and no injury will result.

In order to retain the bar 248 in its elevated position a latch 300 is provided, pivoted to a stud 301 projecting from the bracket piece 231 and adapted to engage a suitable part of the bar 248. As shown in the present instance, this part is the flattened under side of a stud 302 projecting from said bar. When the latter is in its lower position the latch rests against the rear face of the stud as shown in Fig. 1, but when the bar is lifted to its upper position the latch engages the stud as shown in Figs. 4 and 9 and holds it up, said latch being moved by gravity or a suitable spring.

In order that the bar 248 may be freed from the latch 300 when said bar is drawn forward any suitable means can be provided to arrest the latch against following the entire forward movement of the bar. In the present instance said latch is shown in Fig. 4 made at its upper end with an arm 303 adapted to contact with the shaft 277 and thus arrest the motion of the latch. In order to prevent the bar from immediately dropping down on its forward stroke, a stud 304 is screwed into the wall of the box 177 and projects into such position that when the bar 248 is moved forward said bar moves over said stud but not at first quite in contact with the stud. The construction is such that when the bar is freed from the latch 300 it drops a very little until it rests on and slides over the stud 304 but this drop is sufficient so that on the return stroke of the bar the stud 302 does not re-engage the latch but contacts with the vertical face thereof and pushes the latch back to the position shown in Fig. 1. As soon as the end of the bar runs off the stud 304 it drops down on to the screw 270 as shown in Fig. 1. The bar is thus automatically disconnected from the tooth 246 every time the carriage is returned to its right-hand position, and it remains disconnected until in the leftward travel of the carriage the cam 290 again rides over the arm 286.

Any suitable means can be provided for guiding the free end of the bar 248. As here shown two cheek-pieces 305, Figs. 1, 4 and 9, are secured to the lever arm 245, one on each face thereof and these project beyond the end of said lever arm so as to embrace the bar 248 as shown in Fig. 9 and thus to guide said bar.

It is in most cases preferable to provide a key in or convenient to the keyboard for setting into operation the carriage return mechanism in addition to or instead of the automatic means above described. Such a key is shown in Fig. 2 at 306 consisting of a lever whose hub 307, Fig. 9, is loosely mounted on the right-hand end of the shaft 195. This shaft is journaled at its left-hand end in lugs 308 projecting downward from the box 177 and it passes through a hole in the left-hand side plate and is near its far end journaled in the right-hand side plate of the base 1 of the typewriter, the hub 307 being on the outside of said right-hand side plate. For convenience in assembling the machine, the shaft 195 may be made in two parts joined together between the box 177 and the left-hand plate of the machine base 1, as shown in Fig. 9. The ends of the two sections of the shaft are each cut to a semi-cylinder, and said ends are overlapped and bound together by a collar 310 and set screw 311. This juncture can be almost instantly disconnected by loosening said screw. The left hand section of the shaft and the parts carried thereby thus become parts of the attachable and detachable unit carried by the box 177. The key 306 is shaped at its forward end to be struck conveniently by the edge or palm of the operator's right hand.

The hub 307 could be rigidly fastened on to the shaft 195 but for reasons that will be presently explained, it is preferable to have the lever arm 306 yieldingly connected with said shaft so that in case the operation of the shaft is blocked the key can go down without injuring anything. To this end said hub is formed with a hole 312 diametrical thereof and a pin 313, Fig. 2, is tight in the shaft 195 and it passes through the hole 312 but is smaller in diameter than said hole, so that whereas the pin limits the relative motions of the hub and the shaft, the hub can have independently of the shaft a motion equal to that of the depression of the key. The motion of the key is communicated to the shaft through a stiff spring 314 coiled about the hub and at one end hooked under the key lever 306 and at the other end hooked around the projecting end of the pin 313. A screw 315 screwed into the end of the shaft has a flat head which retains the hub of the lever in position.

It has been mentioned hereinbefore that the bell crank 194 is pivoted on the shaft 195. As shown in Fig. 9 this bell crank has a hub 316 which is pivoted on the shaft and just to the left of said hub is another hub 317 which is fastened on the shaft with a set screw 318, these two hubs occupying the space between the two lugs 308 in which the shaft is journaled. The hub 317 has mounted thereon a lever arm 320 having a pin 321 projecting therefrom toward the right as shown in Figs. 9 and 1. The pin 321 lies underneath a rearwardly directed arm 322 of the bell crank 194. The construction is such that said bell crank can be operated automatically by the devices on the typewriter carriage without rocking the shaft 195 but when said shaft is rocked by the key 306 it, through the pin 321, operates the bell crank 194 to trip the latch 187 and start the motor into action.

The key lever 306 is guided and restored by devices shown in Figs. 2 and 16, Sheet 3 of the drawings. Secured to the outside of the right-hand plate of the base 1 by screws 323 is a small casting 324 which projects right-ward and has in it a vertical slot 325 through which the key lever passes and in which it is adapted to move up and down. This casting has a hole 326 bored into it from the top and the lower part of said hole is occupied by a compression spring 327 which acts on a round plunger 328 which is also slotted from the top for the reception of the key lever. This plunger sliding up and down in the hole guides the key lever and the bottom of the slot 325 limits this motion; and the spring 327 restores the lever to normal position. The upward motion of the parts is limited by a top plate 330 secured to the upper surface of the casting by a screw 331.

It has been mentioned hereinbefore that it is desirable when the control mechanism is tripped off and the control shaft 146 is allowed to be rocked by the spring 164, that the electric contacts be closed before the clutch teeth come into engagement.

This mode of operation could lead to a minor trouble with the apparatus as follows: When the carriage has first been returned to the right the bar 235 is pulled forward and it cams down the arm 184 in the manner hereinbefore described, and said arm is held by said bar in its lower position as long as the carriage is in its extreme right-hand position. If now the operator makes a few strokes on the keys the carriage will at each stroke be fed one letter space to the left, thus allowing the margin stop 220 to be withdrawn leftward a letter space at a time, and the arm 218 and rod 215 and all of the parts controlled thereby, including the bar 235, stepped backward toward their normal positions in unison with the letter space feed of the carriage. In the course of this backward travel of the bar 235 there will come a time when the incline 240 is in an intermediate position between its normal backward position and its forward operated position. If at this time the key 306 be operated to release the latch 187 the roller 243 and arm 184 will not be able to jump up to their proper operative positions shown in Fig. 4 but will be arrested by the incline 242 in an intermediate position. If this intermediate position should happen to be such that the electric contacts have been brought together but not high enough to engage the clutch teeth, then the motor would race, having its circuit closed but no load on it. In order to avoid this contingency the following mechanism shown in Figs. 1 and 4, has been devised. A dog 332 is pivoted on a stud 333 riveted into the right-hand wall of the box 177 preferably by means of the eccentrically disposed reduced part similar to the stud 188 and similarly adjustable by means of a screw-driver. The dog 332 may be retained in place by a cotter-pin 334. Said dog has a tooth 335 which is adapted to drop down in front of the projecting upper end of the latch 187, as will be understood from the drawing; but the dog is normally held up by a stud 336 projecting rightward from its end and overlying the bar 235. Said bar is provided with a lug 337 which when the bar is in its normal or extreme rear position holds the dog 332 up in its inoperative position but a short motion forward of said bar 235 will move the lug from under the stud and allow the dog to drop down. When therefore the carriage is returned to the right and the bar 235 is pulled forward, camming the arm 184 downward, and the latch 187 snaps over the end of said arm, this dog 332 drops down in front of the latch and locks said latch against the motion necessary to release it. During the first few letter space steps of the carriage this dog remains in locking position and it is not lifted to its inoperative position shown in the drawing until the bar 235 has been so nearly restored to normal position that if the key 306 were to be operated the arm 184 could rise high enough not only to close the circuit but also to close the clutch; in fact, in the machine shown in the drawing the latch 187 is released by the last step of the bar 235 to normal position. It is partly on account of this dog 332 that the spring 314 hereinbefore referred to has been interposed between the key lever 306 and the shaft 195.

Before leaving this part of the machine some of the details of construction may be described. It has been mentioned for example that the rod 215 is pivoted to the bell crank 217 by a pin 216, Figs. 1 and 6. As actually shown said rod 215 is for the greater part of its length a round rod and it is screwed at its end into a bearing piece 340, the construction being such that the effective length of the rod can be regulated or adjusted by screwing it in or out of this bearing piece. Said bearing piece is bifurcated or slotted to embrace the bell crank 217 and the holes through the bifurcations and through the bell crank are of the same diameter. The pin 216 is simply a straight pin whose length is substantially equal to the thickness of the bearing piece 340. It is simply inserted in the hole and is retained in place by ears 341 bent down on the two sides of the bearing piece from a thin spring plate 342 which lies on top of said bearing piece and at its right-hand end is bent down so as to lie snug against the right-hand end of said bearing piece as shown in Fig. 6. This bent-off section of the spring is perforated, the round part of the rod 215 passing through it. A nut 343 screwed up against this section of the spring performs the double function of holding the spring in place and acting as a lock nut to secure the adjustment of the rod 215. These parts can be almost instantly disassembled by simply springing the thin plate 342 upward until its ear 341 is free of the pin 216 whereupon said pin can be pushed out. It will be observed that a number of the joints in this train of mechanism are made substantially as described and with the same result, namely, that they can be almost instantly assembled and disassembled and that they provide adjustment for the lengths of the various rods. The construction is also such as to keep the rods from turning. When the parts are assembled it is only necessary to release the spring plate 342 when its ears will drop down in position to retain the pin. There is not the slightest danger of these pins coming out and as they are merely straight pins they make excellent pivots.

Access to the inside of the control box 177 can be had very easily by removing the four screws 182. Most of the mechanism in the box is very readily assemble l and disassembled. For example, the two pawls or dogs 187 and 332 are retained on their pivots by cotter pins. The pivots such as 192, 273, 274 do not pass through round holes in the links 191 and 272 but pass through slots 344, and the heads of the studs such as 192, 273, etc., have the form of round heads that have been flattened off on two opposite sides to a width equal to the diameter of the pivot. Each of these studs passes through the part to which it is secured and through a washer like 189 hereinbefore described, and is riveted up, and whereas this riveting will hold the stud against any accidental displacement still each stud can by the application of a tool be turned slightly. In making the parts each of these studs is turned to such a position that it is possible to move the two pieces that are pivoted together into such angular relation with each other that the head of the stud can be slipped through the slot. For example, the spring 190 may be unhooked, and the pawl 187 may then be turned somewhat forward from its normal position, whereupon the link 191 can be simply pulled off the stud 192 and the parts thus immediately disconnected. The cotter pin may then be removed and the pawl slipped off its pivot. The lever 194 can be rocked rearward and the link 191 turned upward until the head of the stud 193 can be slipped through the slot 344. The bar 248 can be immediately removed by simply springing the thin plate 254 outward until it is free from the head of the pivot pin 253 and this spring can then be swung aside, whereupon the pin 253 can be pulled out with the fingers, thus freeing the bar 248 from the piston rod 250. Said bar may then be lifted upward at its rear end and moved into such a position that the head of the stud 273 can be slipped through the slot 344 in the link 272 and said link can then be instantly removed from the arm 275. The bar 235 can be released from the arm 233 by turning upward the retaining spring 240 and then a slight movement of the front end of this bar will enable it to be slipped off the stud 237. In fact most of the mechanism in the box can be assembled and disassembled in a very short time with hardly any use of tools.

In order to lock the printing keys of the typewriter while the carriage is being returned by the motor, a locking bar 345, Fig. 2, is pivoted in the base of the machine at 346, said bar having along its lower edge a flange for co-operation with the usual hooks 347 provided on the printing key levers. This construction need not be more particularly described because as here shown it is identical with that which has heretofore been used as part of the line lock mechanism of the Remington typewriter. The locking bar 345 has fastened thereto an upwardly projecting arm 348 to which is pivoted the forward end of a push link 350, the rear end of which is pivoted to the arm 148 that depends from the control shaft 146. When the mechanism is tripped off to start the motor, the arm 148 moves forward and swings the bar 345 into locking position as shown in Fig. 4. This arm 148 remains in its forward position as long as the main clutch is closed, which is until the carriage is almost entirely restored, and the keys are therefore locked practically during the entire return travel of the carriage.

As has been pointed out hereinbefore the computing mechanism includes a master dog operated by the universal rock shaft 75, Fig. 2, which dog when a numeral key is depressed enters the rack 82 on the computer truck 81 and locks the carriage. It is impossible for the automatic carriage return mechanism to operate while this truck lock is in operation but an operator might thoughtlessly or accidentally strike the carriage return key 306 at such a time. This would bring the electric motor into operation while the carriage was locked which might result in damage. An interlock to make this operation impossible is shown in Fig. 2. As there shown it consists of an arm 351 fast on and projecting upward from the rock shaft 195 and terminating in an abrupt end 352 and in a curved forward edge 353, this edge being substantially concentric with the rock shaft 80. The key 306 is designed to rock the shaft 195 clockwise in Fig. 2, and such an operation brings the abrupt end 352 under the end of the arm 78 or the link 77 pivoted thereto, and will block any operation of a numeral key at that time. If a numeral key is depressed, and the master dog is in engagement with the rack 82, the arm 78 will be standing in front of the curved part 353 of the arm 351 and will make impossible the rocking of the shaft 195. It has been pointed out hereinbefore that the key 306 is connected with said shaft through a stiff spring which can yield under the conditions just mentioned, allowing the key to go down without rocking the shaft 195 and without causing any injury.

The automatic line space mechanism is operated by an initial sliding movement of the rack 140 independently of the carriage, which sliding motion is permitted by the slots 142, Fig. 11. This sliding motion operates an arm 354, Figs. 2, 11, 13, 14 and 15, mounted on the lower end of a vertical rock shaft 355 where it is secured in place by a screw 356 threaded into the end of the shaft. This screw is made in the form shown in Fig. 13 with the head of it prolonged downward and enlarged at its lower end, the screw pressing a washer 357 against the arm 354. About the elongated head of the screw is coiled a returning spring 358, which at one end engages a stationary part and at the other a grooved pin 360 riveted into the arm 354. The rear end of the arm 354 lies against the right-hand end of the rack bar 140 so that when said rack bar is operated as indicated in Fig. 11 the shaft 355 is rocked clockwise as viewed from above. This shaft is journaled in a bracket 361 secured as will be presently described to the right-hand side of the typewriter carriage. At its upper end the shaft has a leftward extending arm 362 secured thereto by a screw 363. As best shown in Fig. 14 this arm has a pin or stud 364 depending therefrom and standing just in front of an ear 365 bent off rightward from the under side of a curved link 366. This link is guided at its rear end by a longitudinal slot 367 therein engaging over a shouldered and headed screw 368 secured to the shift frame of the typewriter carriage so as to be moved up and down with said frame. As shown in Fig. 2 the pin 364 is of such length as to allow of this up and down motion without becoming disengaged from the ear 365. The construction is such that when the power is first turned on, the long link 366 is pulled rearward. Said link at its forward end is pivoted to the screw 22 which as best shown in Fig. 14 is prolonged rightward for the purpose, this being the screw which serves as a pivot connecting the bell crank 20 with the link 23 of the ordinary Remington line space mechanism. In the present instance the link 366 is connected to said pivot screw at the right of the bell crank 20 where it is retained in position by a nut 370. The whole result is that the independent motion of the rack 140 operates the bell crank 20 of the line space mechanism the same as if it had been operated by the handle 14.

The bracket 361 may be variously constructed. As here shown it consists essentially of a barrel-like vertical part (in which the shaft 355 is journaled and housed) and a downwardly extending arm; and it is secured to the typewriter carriage truck 6 by means of two screws 371 and 372. These screws take the place of screws already in the machine, they being screws which project through the truck and have their inner ends reduced to constitute pivots for the devices which support the case shift frame of the typewriter. The screws are merely prolonged and provided with heads so as to serve also as fastening means for the bracket 361. In the drawing the case shift frame 19 of the typewriter is shown but its connections with the carriage truck have been omitted in order to avoid complicating the drawings, these being parts thoroughly familiar to those skilled in the art.

The retarder or governor for controlling the free runs of the carriage in both directions is of the two-cylinder air-pump type shown in the pending application of Joseph B. Holden filed Sept. 30, 1924, Sr. No. 735,050, for typewriting machines; but I have added features not shown in said Holden application. This governor is situated at the back of the typewriter a little to the left of the carriage return drive mechanism as shown in Fig. 6. The stationary part of the governor comprises a main casting 374 having, as will be understood by comparing Figs. 1 and 8, three cylindrical parts, their axes perpendicular to each other. Of these the two horizontal ones are air-pump cylinders 375, and the vertical one 376 is a standard secured to the top plate 3 of the typewriting machine. This is hollow and it contains the drive shaft 377 of the governor as shown in Fig. 1; and it projects downward through a suitable hole bored in the top plate, said hole being counter-bored both above and below. An annular shoulder of the standard 376 rests in the upper counterbore. The lower end of this standard is screw threaded and a cap nut 378 is screwed on to it from below; its upper edge being screwed up tight against the lower counterbore referred to and thus the standard is firmly secured in place. The cap nut 378 has spanner holes 380 by which it can be turned.

The shaft 377 may be variously journaled. As here shown near its upper end it has a collar 381 fastened on it by a pin, and the upper part of this collar forms a ball race; and a co-operating ball race 382 is screwed from above into the vertical cylinder 376. On its upper end said shaft has a sheet metal arm 383 fixedly secured by flattened sides of the shaft and by a screw 384 counter-sunk into the arm so as not to project above it. The arm 383 rotates in a vertical bore in the casting 374 and it carries a wrist pin 385 consisting of the elongated head of a screw threaded into the arm. On this wrist pin are pivoted two pitmen 386. In each of the cylinders 375 is a piston 387 consisting simply of a cylindrical piece of metal and each of said pistons at its inner end is made with a transverse slot 388 into which one of the pitmen 386 extends. These slots are made on either side of a diameter so that as the two pitmen lie one on top of the other the lower one passes into that slot which is just below the diameter and the upper one into that slot which is just above the diameter as will be understood by reference to Fig. 1. Each of the pitmen is pivoted to its piston by means of a pin 390. As the two cylinders are at right angles to each other one of them is giving a maximum of air-resistance at a different time from the other so that the two together exercise over the rotation of the shaft a proper control sufficiently free from jerkiness.

The shaft 377 is connected with the rack bar 140 by a train of gearing and a releasable clutch so that said shaft turns only when a tabulator key is operated and when the electric motor is in operation and the governor is inactive when the carriage is moving step by step leftward. Said gearing includes a pinion 391 loosely mounted on the shaft 377 as best shown in Figs. 1 and 11. The teeth of this pinion are cut only part-way down its length. At its lower end the pinion or its continuation or hub is counter-bored and a small ring or collar 392 is seated in said counter-bore and secured to the shaft 377 by means of a pin 393. Endwise motion of the pinion on the shaft is prevented in one direction by this collar and in the other direction by the ball bearing collar 381, neither of which devices however prevents the pinion from turning loosely on the shaft.

Said pinion meshes with a gear wheel 394 lying flat on the top plate 3, the casting 374 being cut away at 395 to admit this gear. The gear 394 meshes with the pinion 112 as shown in Fig. 11, which pinion is in continual engagement with the rack bar 140 on the carriage. In the present instance, Figs. 11 and 13, the gear 394 is provided with a central ball bearing including a washer 396 and a coned screw 397, the last screwed into the top plate 3; and balls 398 running in a V-groove in the gear.

The clutch between the pinion 391 and the shaft 377 comprises a lower member 400 slidable vertically on the lower end of the shaft 377 which is squared for the purpose as indicated in Fig. 1. This sliding piece 400 is cylindrical externally and takes a bearing in a hole made for the purpose in the cap or nut 378. This piece normally occupies the lower position shown in Fig. 1, but it can be slid upward to cause a pin or tooth 401 projecting from its upper surface to be brought into engagement with one or more teeth 402 projecting downward from the hub of the pinion 391. In the present instance the tooth or pin 401 consists of a headed pin slidable up and down in a suitable hole in the piece 400 and pressed upward by a spring 403 compressed between said pin and a screw 404 threaded into the lower end of the hole, which hole is counterbored as shown for the reception of said spring and the head of the pin 401. This spring-pressed pin is used instead of a solid tooth in case it should happen, when the clutch member 400 is pushed upward, to be standing directly beneath the tooth 402. In that event the upward motion of the member 400 is not arrested and the pin snaps up into clutching position as soon as the pinion 391 begins to turn.

The clutch member 400 rests on a collar 405 secured by a pin 406 to the upper end of a push rod 407 by means of which the clutch is opened and closed. The rod 407 extends downward through the shelf 86 of the base 1 of the machine frame and as here shown it has on its lower end a collar 408 which can be adjusted up and down by means of a nut 410 and lock nut 411 which are threaded on to the rod. This device serves as an adjustable stop to limit the upward motion of the rod; but it is not essential and may be dispensed with if preferred. When said rod is pushed upward the spring pressed pin 401, acting on the pinion 391, tends to elevate the shaft 377 so that the arm 383 runs barely, if at all, against the ball bearing collar 382 and so that the ball bearing takes the real pressure.

The means whereby the rod 407 is controlled from the control mechanism for the carriage return, can be understood by reference to Figs. 3, 6 and 13, where it will be seen that at approximately the level of the control shaft 146 said rod has an arm 412 rigidly mounted thereon and projecting toward the front of the machine. In the present instance the rear end of this arm, where it projects beyond the rod 407, is split vertically and the arm is clamped on the rod by means of a screw 413, a construction which makes the arm adjustable. At its forward end the arm 412 is notched as shown in Fig. 13 so as to rest on what amounts in effect to a stud 414 projecting leftward from the arm 150 which controls the main clutch of the drive mechanism. The stud 414 is of the rather large diameter shown in Fig. 13 and it is made with a peripheral groove in which the arm 412 rests so as to prevent turning of said arm and of the shaft 407. The connection is such that when the arm 150 is raised to close the main drive clutch 137, 135 it also raises this arm 412 and the rod 407 to close the governor clutch as shown in Fig. 4; but said rod 407 can also be raised by the tabulator mechanism as hereinafter described independently of the arm 150.

The tabulator connections for closing the governor clutch are best shown in Figs. 6 and 13. It has been explained that whenever a tabulator key 51 is operated the vertical link 62 is pulled downward. This link is in the present instance modified by providing it with a branch 415 which is pivoted at 416 to a lever arm 417 projecting rearward from a sleeve 418, which sleeve is pivoted on a long pivot screw 420 screwed into a lug 421 projecting leftward from the upper part of the casting 83 as best shown in Fig. 17. On its right-hand end the sleeve 418 has another lever arm 422 projecting downward and rearward and adapted to engage under the collar 405 on the rod 407. For the purpose of adjusting the effective end of this lever arm 422 the latter is extended somewhat downward and it has an adjustable device 423 mounted on it by means of a pin 424. Said device 423 is a piece of sheet metal folded back on itself so as to embrace the arm 422 between its two branches. Adjusting screws 425 screwed into the transverse part of the fold are adapted to be screwed down tight against the flat or straight end of the arm 422. The device 423 has a projecting end 426 which lies beneath the collar 405 and is adapted to operate it. This operative end can be adjusted up and down by loosening one of the screws 425 and tightening the other. The whole construction is such that when a tabulator key 51 is operated and the link 62 is pulled downward the arm 422 is moved upward and the end 426 lifts the collar 405 and rod 407 and thus closes the clutch of the governor to bring the latter into operation to control the feed of the carriage.

The vents for the two-cylinder air-governor may include one in the end of each of the two cylinders 375. These cylinders are closed at their ends each by a cylinder head constructed of two pieces of sheet metal 427 and 428 riveted together as shown in Fig. 1, the inner piece 427 being externally threaded and screwed into the end of the cylinder and the outer piece 428 being of greater diameter and lying against the end of the cylinder and having a knurled edge. A vent-hole 430 is made through each of these cylinder heads and means are provided to regulate its effective size. Said means as here shown consists of a disk 431 of approximately circular outline and provided with an extension 432 by means of which the disk can be turned about its pivot 433. This pivot consists of a shouldered and headed rivet riveted into the cylinder head but passing eccentrically through the disk 431. A convex spring washer 434 lies between the head of the pivot and the disk 431 in order frictionally to hold said disk in its adjusted position. Since the pivot passes eccentrically through the disk, the disk can be made to expose the hole 430 entirely, to cover said hole entirely, or to occupy any intermediate position by turning the disk to a suitable extent as will be readily understood. These vents are adjusted to give the governor its maximum desired resistance appropriate to the carriage return motor, which preferably has considerably more power than the spring motor which drives the carriage in letterspace direction.

The governor is provided with additional vents and with means for automatically opening and closing them, said means being controlled by the carriage return mechanism and the tabulator mechanism in such wise that when the tabulator is used these additional vents will be opened so as to afford that minimum desired resistance to the run of the carriage which is appropriate to the strength of the spring motor; and when the electric carriage return mechanism is in operation these additional vents will be closed to a greater extent or closed entirely so as to offer a higher resistance. Such automatically varying vents can be produced in a variety of ways, that here shown being convenient and effective. Referring to Fig. 8, that part of the casting 374 on the inside of the right angle formed by the two cylinders 375 is thickened. For each cylinder a hole or port 435 is drilled in through the casting to the inside of the cylinder near the end of said cylinder and said hole is afterwards closed at its outer end by a screw plug 436. Another hole 437 is drilled across the hole 435 and parallel with the cylinder 375, this last hole having its outer end closed by a screw plug 438. The two holes 437 are drilled in until they meet and constitute an air passage connecting the two ports 435. The effect of this system if it is left open would be to connect the two cylinders with each other so that one of them would pump air into the other. This alone would greatly reduce the resistance of the governor, the holes referred to being large enough to allow the air to pass quite freely. They would not completely stop the air resistance however because the two pistons do not work oppositely. In order to make the lessening of the resistance still greater, therefore, another hole 440 is drilled in from the outside of the casting at a convenient point, connecting with one of the holes 437 so that the effect of this system of holes or passages is, when said system is open, practically to open up the cylinders so that air can be pumped into and out of them with comparative freedom, the governor then offering only a small amount of air resistance.

At the point where the hole 440 connects with hole 437 a vertical hole 439 (Fig. 13) is drilled through of larger diameter than those above described and intersecting the hole 437 as will be understood from Fig. 8, where this larger hole is shown closed by a plunger 441, the entire construction constituting a sort of valve. The form of the plunger 441 can be understood by reference to Fig. 13, where it will be seen that it terminates inside the casting a short distance above the hole 437 and extends out of the casting and for some distance below. At a point which is normally a short distance below the hole 437 the plunger 441 is made with a peripheral cutout 442 in the shape of the frustrum of a cone having its apex downward. This plunger 441 stands in the position shown in Fig. 13 during the time when the carriage is being restored by the motor, so that then this whole system of additional vents is blocked and out of operation entirely. At this time the resistance is regulated entirely by the vents 430 which are the only ones that are effective and these are therefore adjusted so as to give the desired speed to the carriage on its return motion.

When the tabulator is in use the plunger 441 occupies an elevated position such that the peripheral cutout 442 comes more or less into the plane of the holes 437 and 440 so as to open up the extra vents. In the present instance said plunger is normally in its lower position and it is raised to its upper position when a tabulator key is operated. To this end the plunger 441 is slotted at its lower end and a link 443 is pivoted thereto by a pin 444, which pin is retained in place by a retaining spring 445 of any suitable character. The link 443 at its lower end is by means of a shouldered and headed screw 446 pivoted to the rear end of a lever arm 447, which lever arm, Figs. 6, 13 and 17, has its hub 448 pivoted on the same screw 420 as the lever 417, 422. A spring 450 connected to an ear 451 of the lever 447 tends to rock said lever to force the plunger 441 upward. Said lever is held in its normal position where said plunger is depressed by means of an arm 452 hanging down from the lever 447 in position to be operated by the pin 424 hereinbefore referred to, which pin is elongated for the purpose. This pin projects from the lever 422 which is controlled by the tabulator mechanism. When a tabulator key is operated and the link 62 is pulled downward, thus rocking the lever arm 422 upward, the lever 447 is then permitted to be rocked by its spring 450 to elevate the plunger 441.

The lever 447 is thus independently operated by a spring in order that the height to which the plunger 441 is raised may be varied in order to vary the resistance offered by the governor to the leftward run of the carriage. The cutout 442 being made on a taper as described, the extent to which the vent holes 437, 440 will be opened will depend upon how high this plunger is raised. If it is raised to its greatest extent these holes will be thrown practically wide open, but if raised to a lesser extent the passage opened for the air will be reduced. The height to which the plunger can rise is regulated by a stop screw 453 screwed down into the same hole as that occupied by the plunger 441, which hole is for the purpose prolonged upward through a lug 454 on the casting 374. The screw 453 is provided with a lock nut 455. When the plunger 441 moves upward it is arrested by the lower end of this screw which can be adjusted up and down to vary the point of arrest.

The conical part 442 of plunger 441, when said part is raised into the plane of the holes 437 and 440, not only opens said holes 437 into the outer air through hole 440, but it also opens said holes 437 into each other, so that air can be, and to a certain extent is, pumped from one cylinder into the other. It should also be mentioned that, if preferred, the vents 430 could be omitted altogether, in which case it would be desirable to provide an adjustable means to regulate the lower as well as the upper position of the plunger 441, so as to give a small amount of vent thereby when the carriage return mechanism is in use.

It is preferable that the plunger 441 have a fairly snug fit in the hole 439 and if the screw 453 were solid the motion of this plunger up and down would itself be cushioned by air resistance. To prevent this a hole 456 is drilled vertically through the center of the screw 453.

It may be mentioned that as here shown the lever 447 is provided with a forwardly extending arm 457 adapted to contact as shown in Fig. 13 with the cross shaft 122 to limit the motion of this lever and of the lever 422 to normal position.

So far as I am aware, it is broadly new in machines of this character to provide a governor for the control of the carriage with means to vary its operation according to which of two different driving means is acting on the carriage.

In Figs. 14 and 15 I have shown my invention applied to a machine somewhat differently equipped from that hereinbefore described and in which an additional function is obtained. With the exceptions to be hereinafter pointed out the whole machine is identical with that already described. It is a Remington typewriter of the general style known commercially as No. 12 and the motor 92 is connected up with the rack bar 140 in the same way as hereinbefore described, and said rack bar has an endwise motion for line spacing, the same as hereinbefore. Also the controlling mechanism for the motor circuit and clutch may be the same.

The machine shown in Figs. 14 and 15 is equipped with the platen clutch mechanism described in the application for patent for typewriting machines filed by Mr. Edwin E. Barney on Dec. 30, 1922, Sr. No. 610,058. According to the Barney construction the line space wheel 28 is not rigidly connected with the platen 10 but is connected with it through a clutch. This clutch has not been fully shown in the present instance because it is well known in the art, having been used for a number of years in Remington typewriters and being fully described in the patents to Oscar Woodward, Nos. 784,369, dated March 7, 1905, and 945,358, dated Jan. 4, 1910. It comprises a tube 460 surrounding the platen shaft 11 which shaft is movable endwise and carries certain devices for controlling clutch levers 461. The outer end of the shaft 11 which has the finger wheel 13 mounted thereon can be pushed in with the effect of releasing the clutch, or it can be pulled out with the effect of closing the clutch by tightening the clutch levers 461 against a flange of the toothed wheel 28. In the patents to Woodward this clutch is normally kept in its closed position by a spring but according to the Barney invention this spring is omitted so that the clutch is normally open; and if desired a spring can be put in to open it. Means are provided for automatically closing the clutch every time the line space mechanism is operated, the closing of the clutch being effected by pulling outward on the shaft 11. To this end said shaft has a flange 462 against the left-hand surface of which rests the end of a lever arm 463 which is pivoted to the right-hand end bar of the carriage 6. As here shown this lever arm passes underneath said carriage bar and at a short distance to the left thereof it is bent first upward to form a yoke-piece 464 and thence horizontally to the right to form an arm 465 which lies on top of the cross bar of the carriage. The pivot for the lever consists of a screw 466 passing through the arm 465 and through a bearing hole in the cross bar of the carriage and threaded at its lower end into the lever arm 463. Secured to the vertical yoke-piece 464 of the lever thus constructed is a block 467 constituting in effect a sort of cam on which rolls a roller or small wheel 468 journaled on a headed stud 470 projecting from the left-hand side of the bell crank 471 which in this form of the invention takes the place of an ordinary bell crank 20 of the Remington machine. Except for the mounting on it of the roller 468 this bell crank is similar to the bell crank 20 hereinbefore described and the link 366 of my mechanism is pivoted to the screw 22 the same as in the machine heretofore described. This bell crank normally occupies the extreme position shown in Fig. 15. It is connected with the line space dog 25 by a link 472 similar to the link 23 but with this difference, namely, that the link 472 has in its forward end a slot 473 which engages the pivot 22 so that the latter when it is operated has a certain amount of lost motion before beginning to operate the link 472. This lost motion is utilized in operating the cam 467 which cam is forced rearward by the roller 468, thus rocking the lever arm 463 and closing the platen clutch just before the dog 25 begins to turn the wheel 28. The effect of this construction is to leave the platen normally free of the line space wheel so that a ruled blank can be inserted in the machine and the platen turned freely to bring the first ruled line to writing position. Thereafter the clutch is closed every time the line space mechanism is operated but opens immediately thereafter. The whole construction is such that the platen clutch is operated by my power mechanism just prior to or as a part of the line spacing operation.

In the particular machine shown, the regular line space handle is preferably omitted. For this reason I have provided a returning spring 474 for the bell crank 471. This spring may be conveniently coiled about the stud 21 and at one end hooked around the bell crank and at the other end around a pin 475 inserted in the end bar of the carriage.

The particular machine illustrated in Figs. 14 and 15 was designed for certain special uses which render adjustable margin stops unnecessary or undesirable. The right-hand stop for the carriage therefore has been replaced by a special stop 476 which is not adjustable but is secured permanently in place by a screw 477. This stop may have any convenient construction. As here shown it consists of a block of metal having at its rear part an upstanding flange that is engaged by a sheet metal cover 478 which is part of the ordinary carriage equipment of the Remington machine, and the screw 477 passes through a hole made for the purpose in this plate and is threaded into the stop piece 476.

It is sometimes desirable to cover up that part of the control mechanism which is mounted on the front of the typewriter carriage, and in the machine shown in Figs. 14 and 15 this has been done by providing a cover plate 480 extending lengthwise of the front bar of the carriage and suitably bent downward at its front and rear edges and secured in place by screws 481 similar to screws ordinarily used in the Remington machine.

It will of course be understood that numerous changes may be made in the details of construction and arrangement without departing from my invention.

What I claim as new and desire to secure by Letters Patent, is:

1. In a typewriting machine, the attachable and detachable frame for the driving train of a power carriage return mechanism, inserted at its upper end in a hole in the top plate of the machine and secured at its lower part to the base of the typewriter.

2. In a typewriting machine, the attachable and detachable frame for the driving train of a power carriage return mechanism inserted at its upper end in a hole in the top plate of the machine, and means for securing its lower part to the base of the machine with provision for adjustment to regulate the extent to which the upper part of said frame passes into said hole.

3. In a typewriting machine, the combination with the frame and carriage, of a power driving train for said carriage having an attachable and detachable frame inserted at its upper end in a hole in the top plate of the machine, a power shaft in said upper end and having a drive pinion thereon, a carriage rack geared to said pinion, and means in addition to said hole for securing said attachable frame to the machine frame.

4. In a typewriting machine, the combination with the frame and carriage, of power drive mechanism for said carriage comprising an attachable and detachable frame inserted at its upper end through a hole in said machine frame and secured at its lower part to said machine frame, a drive shaft within and projecting beyond said inserted end, a drive pinion on said projecting part of said shaft, a carriage rack geared to said pinion, a motor, and a clutch mounted on said attachable and detachable frame between said motor and said drive shaft.

5. In a typewriting machine, the combination with the frame and carriage, of power drive mechanism for said carriage comprising an attachable and detachable frame secured to the lower rear part of the machine frame and projecting thence into the machine and thence upwardly, means for positioning the upper end of said detachable frame, a vertical shaft in said upper end and having thereon a pinion, a carriage rack geared to said pinion, a horizontal shaft journaled in said detachable frame, beveled gearing on said horizontal and vertical shafts, a clutch mounted in said detachable frame and connecting one of said beveled gears with its shaft, a motor, and a flexible connection between said motor and said horizontal shaft, 6. In a typewriting machine, the combination with the carriage and the machine frame including a base and a top plate, of power drive mechanism for said carriage comprising an attachable and detachable frame inserted at its upper end through a hole in the top plate and secured at its lower part to the machine base, a vertical shaft in said upper end and projecting therefrom above the top plate, a pinion on said vertical shaft, and a carriage rack geared to said pinion.

7. In a typewriting machine, the combination with the carriage and the machine frame including a base and a top plate, of power drive mechanism for said carriage comprising an attachable and detachable frame inserted at its upper end through a hole in the top plate and secured at its lower part to the machine base, a vertical shaft in said upper end and projecting therefrom above the top plate, a pinion on said projecting end of said vertical shaft, and a carriage rack geared to said pinion, said pinion being of no greater diameter than the upper part of the detachable frame so that said frame can be put into place while the pinion is on the shaft.

8. In a typewriting machine, the combination with the carriage and the machine frame including a top plate, of power drive mechanism for said carriage comprising an attachable and detachable frame, inserted at its upper end through a hole in the top plate and having means to secure it in position, a vertical shaft in said upper end and projecting therefrom above the top plate, a pinion on the projecting end of said shaft of such diameter that it can be inserted through said hole in the top plate along with the detachable frame, and a carriage rack geared to said pinion.

9. In a typewriting machine, the combination with the carriage and frame of the machine, of power drive mechanism for said carriage comprising an attachable and detachable frame having its lower part at the rear of the machine and its upper part adjacent the typewriter carriage, a vertical shaft in said upper part having a pinion geared to a rack on said carriage, a horizontal shaft in said frame, gearing, and a clutch between said horizontal and vertical shafts, a motor mounted on a shelf on the lower part of said frame, and a flexible and detachable connection between said motor and said horizontal shaft.

10. In a typewriting machine, the combination with the carriage and framework of the machine, a power drive mechanism for said carriage comprising two attachable and detachable units, one of said units being a drive unit, the whole of which is mounted in an attachable and detachable frame and the other of which is a control unit also mounted on an attachable and detachable frame, said drive unit including a motor and a clutch, a rock shaft extending from one of said units to the other and having means to control said clutch, and means in said control unit for controlling said rock shaft.

11. In a typewriting machine, the combination with the carriage and framework of the machine, of power drive mechanism for said carriage comprising two attachable and detachable units, one of said units being a drive unit comprising a motor and driving connections from said motor to said carriage and including a clutch, and the other being a control unit, a rock shaft extending from one of said units to the other and having means to control said clutch, a spring for operating said rock shaft to close said clutch, a latch in said control unit for holding said rock shaft in clutch releasing position, and means in said control unit for releasing said latch.

12. In a typewriting machine, the combination with the carriage and the framework of the machine, of power drive mechanism for said carriage comprising an attachable and detachable drive unit, said unit having a frame, a vertical shaft journaled in said frame and geared to said carriage, a horizontal shaft in said frame and geared to said vertical shaft, a clutch, a motor having its shaft in alignment with said horizontal shaft, a releasable coupling between said motor shaft and said horizontal shaft, said motor being mounted on a shelf of said detachable frame, and a rock shaft journaled in said frame and having means to operate said clutch.

13. In a typewriting machine, the combination with the carriage and framework of the machine, of power drive mechanism for said carriage comprising a motor and a driving train including a clutch; a control unit for said driving mechanism comprising an attachable and detachable frame, a device mounted in said frame and operatively connected to control said clutch, a spring for operating said device to close said clutch, a latch for said clutch controlling device, a cam for operating said device to open the clutch, and a dash pot all mounted in said detachable frame; and means outside of said detachable frame to operate said latch and said cam and to operate said dash pot near the end of the run of the carriage.

14. In a typewriting machine, the combination with the carriage, of a shock absorber, means for operating said shock absorber from said carriage, means whereby an operation of said shock absorber to check the arrest of the carriage results in its becoming automatically disconnected, and means controlled by said carriage at a predetermined distance from the point of arrest for automatically re-connecting said shock absorber.

15. In a typewriting machine, the combination with the carriage, of a shock absorber, means for operating said shock absorber from said carriage, means whereby an operation of said shock absorber results in its becoming automatically disconnected, and means controlled by said carriage at a predetermined distance from its point of arrest for automatically reconnecting said shock absorber, the last recited means being adjustable to vary said predetermined distance.

16. In a typewriting machine, the combination with the carriage, of a device which is picked up by said carriage and moves with it through the latter part of a free run of said carriage, a shock absorber, connections between said device and said shock absorber, means for disconnecting said connections at the end of a free run of the carriage, and means whereby the travel of the carriage to a predetermined point restores said connections.

17. In a typewriting machine, the combination with the carriage, of a device which is picked up by said carriage and moves with it through the latter part of a free run of said carriage, a shock absorber, connections between said device and said shock absorber, means for disconnecting said connections at the end of a free run of the carriage, and means whereby the travel of the carriage to a predetermined point restores said connections, said means being adjustable to vary the point in the travel of the carriage at which said connections are re-connected.

18. In a typewriting machine, the combination with the carriage of said machine and means for imparting a free run to said carriage, of a stop on said carriage; a device picked up by said stop and carried with it during the last part of said free run; a shock absorber; connections from said device to said shock absorber; means for breaking said connections after an arrest of said carriage; and means operated by the travel of said stop at a predetermined distance from the end of said free run for restoring said connections.

19. In a typewriting machine, the combination with the carriage of said machine and means for imparting a free run to said carriage, of a stop on said carriage; a device picked up by said stop and carried with it during the last part of said free run; a shock absorber; connections from said device to said shock absorber; means for breaking said connections after an arrest of said carriage; and means operated by the travel of said stop at a predetermined distance from the end of said free run for restoring said connections, the combination including provision for adjustment to vary the points of arrest of the carriage and of the restoration of said connections.

20. In a typewriting machine, the combination with the carriage of said machine and means for imparting a free run to said carriage, of a stop on said carriage; a device picked up by said stop and carried with it during the last part of said free run; a shock absorber; connections from said device to said shock absorber; means for breaking said connections after an arrest of said carriage; and means operated by the travel of said stop at a predetermined distance from the end of said free run for restoring said connections, said stop being adjustable to vary the point of arrest of the carriage, and said restoring means including a part adjustable to vary said predetermined distance.

21. In a typewriting machine, the combination with the carriage and means for imparting a free run to said carriage, of a shock absorber; means for operating said shock absorber during the last part of a run of said carriage, said operating means including a bar and means operated by the last part of the run of the carriage for operating said bar; means operated by the travel of the carriage at a predetermined distance from the end of its free run for moving said bar into operative engagement with its operating means; and a latch for retaining said bar in such engagement; said bar when operated to check the motion of the carriage running off of said latch whereby said bar becomes disconnected from its operating means.

22. In a typewriting machine, the combination with the carriage and means for imparting a free run to said carriage, of a shock absorber; means for operating said shock absorber during the last part of a run of said carriage, said operating means including a bar; means operated by the last part of the run of the carriage for operating said bar; means operated by the travel of the carriage at a predetermined distance from the end of its free run for moving said bar into operative engagement with its operating means; a latch for retaining said bar in such engagement, said bar when operated to check the motion of the carriage running off of said latch; and a support on to which said bar runs when operated; the construction being such that during the reverse movement of the carriage the bar runs off of said support and moves out of engagement with its operating means.

23. In a typewriting machine, the combination with a carriage and means for imparting a free run to said carriage, of a stop on said carriage, a device picked up by said stop during the last part of the free run of the carriage, a shock absorber operable by said device, means whereby after an operation thereof said shock absorber becomes disconnected from said device, a cam associated with said stop, a displaceable part across which said cam runs at a predetermined distance from the end of its free run, and means operated by said part for restoring the connection between said shock absorber and said device.

24. In a typewriting machine, the combination with the carriage and means for imparting a free run thereto, of a stop on said carriage, a device picked up by said stop during the last part of a free run of the carriage, a shock absorber operable by said device, means whereby said shock absorber becomes disconnected from said device after an operation thereof, a rock shaft parallel with the line of travel of the carriage, an arm on said rock shaft, a cam carried by the carriage and adapted to deflect said arm at a point in the carriage travel a predetermined distance from the point of arrest of said carriage, and means operated by said rock shaft for restoring the connection of said shock absorber to said device.

25. In a typewriting machine, the combination with the carriage and the framework of said machine, of a motor for driving said carriage, a driving train from said motor to said carriage and including a clutch, a control unit comprising a frame attached to said framework of the machine, a connection from said clutch extending into said control unit, means in said control unit for causing said clutch to close, a device in said control unit adapted to act on said connection to open the clutch, a stop on the carriage, a device adapted to be picked up by said stop during the last part of the return motion of the carriage, connections from said picked-up device to said clutch-opening device in the control unit, a shock absorber in said control unit, means in said control unit for coupling up and uncoupling said connections, and a part operated by said carriage at a predetermined distance from its point of arrest for operating the last recited means to couple up said connections.

26. In a typewriting machine, the combination with the carriage, the platen and the means including a pawl for rotating said platen, a rack bar mounted on said carriage and movable endwise relative thereto, a motor geared to said rack bar, a vertical shaft mounted on said carriage and having an arm operated by the endwise motion of said rack bar, another arm on the upper end of said shaft, a link operated by said upper arm, a bell crank operated by said link, and a second link connecting said bell crank with said pawl.

27. In a typewriting machine, the combination with the carriage truck, the roller platen, the shift frame in which said platen is mounted, and means including a pawl for rotating said platen, of a motor, a rack bar mounted on said truck and having endwise motion relative thereto, a vertical shaft rocked by such endwise motion, a link on the shift frame operated by said vertical shaft, and connections from said link to said pawl, the combination including means to compensate for the shifting of said shift frame.

28. In a typewriting machine, the combination with a carriage, a roller platen, line space mechanism including a line space wheel, and a platen clutch for operatively connecting the wheel with or freeing it from the platen, of power operated carriage return mechanism, and connections whereby said carriage return mechanism operates said platen clutch.

29. In a typewriting machine, the combination with the carriage, the line space mechanism including a line space wheel, and a normally open platen clutch for operatively connecting the wheel with or freeing it from the platen, of power operated carriage return mechanism, and means whereby said return mechanism when brought into use first closes said platen clutch and then operates said line space mechanism.

30. In a typewriting machine, the combination with the carriage, line space mechanism including a line space wheel, and a normally open platen clutch for operatively connecting the wheel with or freeing it from the platen, of power operated carriage return mechanism; means whereby said carriage return mechanism operates said line space mechanism, said means including a lost motion connection, and means whereby said power operated carriage return mechanism closes said platen clutch during the lost motion period in the operation of the line space mechanism.

31. In a typewriting machine, the combination with the carriage and its letter space feed mechanism, of a power operated carriage return mechanism including a spring closed clutch, a latch for holding said clutch normally open, means whereby the carriage in its letter feed movement trips said latch, and means adjustable to different positions of carriage travel whereby the carriage in its return movement opens said clutch and restores it to the control of said latch.

32. In a typewriting machine, the combination with the carriage and the printing key levers, of power operated carriage return mechanism including a motor, a clutch and controlling mechanism for operating said clutch; and a lock for said printing keys operated under the control of said controlling mechanism so as to lock said key levers and keep them locked during the return of the carriage.

33. In a typewriting machine, the combination with the carriage and the printing keys, of carriage return mechanism including a motor, a drive train between said motor and said carriage and including a clutch, and a shifter for said clutch; and a lock for said printing keys operatively connected with said shifter in such wise that said lock is in locking position whenever said clutch is closed and in unlocking position when said clutch is open.

34. In a typewriting machine, the combination with the carriage and printing keys, of power operated carriage return mechanism including a controlling rock shaft at the rear of the machine, a locking bar for the key levers in the forward part of the machine, and a link connecting said rock shaft with said locking bar.

35. In a typewriting machine, the combination with the carriage, tabulator mechanism acting to give a free run to said carriage in letter feed direction, and carriage return mechanism, of a retarder for the carriage, and means acting automatically to vary the retarding effect of said retarder according as it is used to retard the run of the carriage in letter feed direction or in return direction.

36. In a typewriting machine, the combination with the carriage, tabulator mechanism acting to give a free run to said carriage in letter feed direction, and carriage return mechanism, of a retarder for the carriage normally disconnected therefrom, means whereby said tabulator mechanism and also said carriage return mechanism bring said retarder into use, and means operated by one of the two said mechanisms for changing the normal resistance of said retarder.

37. In a typewriting machine, the combination of a carriage, two motors, each of which may give a free run to said carriage, a retarder for said carriage, and means for varying the resistance offered by said retarder, depending on which of the two motors is brought into use.

38. In a typewriting mechine, the combination with the carriage, a spring motor for said carriage, and a carriage return motor, of a retarder for said carriage, means adjustable to regulate the maximum resistance offered by said retarder, other means for regulating the minimum resistance offered by said retarder, and means whereby when said carriage is driven by its spring drum the minimum retarding effect is produced and whereby when said carriage is driven by its return mechanism the maximum retarding effect is produced.

39. In a typewriting machine, the combination with a carriage, two motors each of which may impart a free run to said carriage, of an air governor for said carriage, means for giving to said governor a vent adapted to control the carriage properly under the action of its return mechanism, and means for giving to said governor an additional vent adapted to the strength of said spring motor.

40. In a typewriting machine, the combination with a carriage, tabulator mechanism acting to give a free run to said carriage in letter feed direction, and carriage return mechanism, of an air governor for said carriage having vents adapted for said carriage return mechanism and having also an additional vent, and means whereby said tabulator mechanism opens said additional vent.

41. In a typewriting machine, the combination with a carriage, tabulator mechanism acting to give a free run to said carriage in letter feed direction, and carriage return mechanism, of an air governor for said carriage having vents adapted for said carriage return mechanism and having also an additional vent, means whereby said tabulator mechanism opens said additional vent, and means adjustable to regulate the extent to which said additional vent is opened.

42. In a typewriting machine, the combination with the carriage and two motors each adapted to give a free run to said carriage, of an air governor for said carriage having vents adapted for the more powerful of the two motors, and having also an additional vent to adapt said governor to the weaker of the two motors.

43. In a typewriting machine, the combination with the carriage and two motors each adapted to give a free run to said carriage, of an air governor for said carriage having vents adapted for the more powerful of the two motors, and having also an additional vent to adapt said governor to the weaker of the two motors, and means acting automatically to operate said additional vent when one of said motors is brought into use.

44. In a typewriting machine, the combination with the carriage, the spring motor therefor, the tabulator mechanism and power operated carriage return mechanism, of an air governor for the carriage normally disconnected therefrom, means operated by said tabulator mechanism and by said carriage return mechanism for bringing said governor into use, said governor comprising means for giving it vent appropriate to the power of said carriage return mechanism, means for giving said governor additional vent appropriate to the power of said spring drum, a valve operated by said tabulator mechanism for opening said additional vent, and means adjustable to regulate the extent to which said additional vent is opened.

45. In a typewriting machine, the combination with the carriage, of carriage return mechanism comprising a motor, a drive pinion, and a carriage rack geared to said pinion; and a governor also geared to said pinion, said carriage return mechanism including control mechanism adapted to clutch said pinion to said motor, and to clutch said governor to said train of gearing.

46. In a typewriting machine, the combination of a carriage, tabulator mechanism and carriage return mechanism, of a two-cylinder air governor for said carriage comprising a shaft and pistons driven by said shaft, said cylinders having each an adjustable vent to regulate the maximum resistance offered by the governor, each of said cylinders having also an additional vent, said additional vents being connected together, a valve controlling said additional vents, and means whereby said valve is maintained closed when the carriage return mechanism is in use and is maintained open when the tabulator is in use.

47. In a typewriting machine, the combination with the carriage and two motors, each of which may give a free run to said carriage, of an air governor for said carriage having means to give it vent appropriate to the more powerful of one of the two motors, and having also an additional vent, a valve for said additional vent, a spring acting to open said valve, an adjustable stop to arrest the opening movement of said valve, and means for holding said valve closed when the stronger motor is in use and allowing it to open when the weaker motor is in use.

48. In a typewriting machine, the combination with the carriage, of two motors each adapted to give a free run to said carriage, a governor for said carriage, means adjustable to provide a maximum resistance for said governor appropriate to the stronger one of the two motors, other means adjustable to provide a minimum resistance for said governor appropriate to the weaker of the two motors, and means for automatically shifting from maximum to minimum resistance or vice versa according to which of the two motors is brought into use.

49. In a typewriting machine, the combination with the carriage, tabulator mechanism for imparting to said carriage a free run in letter feed direction, carriage return mechanism including a motor and control mechanism for bringing said motor into and out of use, of a governor, a drive train from said carriage to said governor, said drive train being normally open, and means operated by said tabulator mechanism and also by said controlling mechanism for closing said drive train.

50. In a typewriting machine, the combination with the carriage and tabulator mechanism for giving a free run to said carriage in letter feed direction, of carriage return mechanism including a motor, a drive train from said motor to said carriage, and controlling mechanism having means for opening and closing said clutch; a governor for said carriage; a drive train from said carriage to said governor including a normally open clutch; means whereby said controlling mechanism closes said governor clutch; and means whereby said tabulator mechanism also closes said governor clutch.

51. In a typewriting machine, the combination with the carriage, of a two-cylinder air governor geared thereto and comprising ports leading from one cylinder to the other, and adjustable means for regulating the amount of vent afforded by said ports.

52. In a typewriting machine, the combination with the carriage, of a two-cylinder air governor geared thereto and comprising ports one from each cylinder, said ports connecting with one another, a third port opening from said connecting ports into the outer air, and adjustable mean for regulating the vent afforded through the last mentioned port.

53. In a typewriting machine, the combination with the carriage, of a two-cylinder air governor geared thereto, two ports one in each of said cylinders, an air passage connecting said two ports, an opening into the atmosphere, said opening intersecting said passageway, and an adjustable device in the intersection of said opening with said passageway to regulate the vent.

54. In a typewriting machine, the combination with the carriage, of a two-cylinder air governor geared to said carriage and having a port in each cylinder, an air passage connecting said ports, an opening from said air passage into the outer air, and a valve in the intersection of said opening with said air passage.

55. In a typewriting machine, the combination with the carriage, of a two-cylinder air governor geared thereto and having two ports one in each cylinder, an air passage connecting said two ports, an opening from said passage into the outer atmosphere, a valve in the intersection of said opening with said passage, means for opening and closing said valve, and means adjustable to regulate the extent to which said valve is opened.

56. In a typewriting machine, the combination with the carriage, of a two-cylinder air governor geared thereto and having two ports one in each cylinder, an air passage connecting said two ports, an opening from said passage into the outer atmosphere, a plunger at the intersection of said passage and opening, said plunger having a reduced part, and means to move said plunger to two positions, in one of which it closes said passage and opening, and in the other of which said reduced part allows air to flow.

57. In a typewriting machine, the combination with the carriage, of a two-cylinder air governor geared to said carriage and having two ports one in each cylinder, an air passage connecting said ports, an opening from said passage into the outer atmosphere, a plunger at the intersection of said passage and opening, said plunger having a tapered reduced part, means for moving said plunger to one position where it closes said passage and to another position where said reduced part allows the air to flow, and means adjustable to vary said other position in order to regulate the amount of vent.

58. In a typewriting machine, the combination with the carriage and two motors for driving said carriage, of an air governor geared to said carriage and having a vent, a plunger across said vent and having a reduced part, and means whereby when one of said motors is in use, said plunger closes said vent and whereby when the other of said motors is in use, the reduced part of said plunger comes in said vent to allow the air to flow.

59. In a typewriting machine, the combination with the traveling carriage, of carriage return mechanism comprising an electric motor and a clutch, a carriage return key and connections for starting said motor and causing said clutch to close, said connections acting to start the motor before the clutch is closed, means whereby said carriage opens said clutch and stops the motor, and means controlled by said carriage for preventing said key from starting said motor until said carriage shall have made a predetermined extent of travel from its extreme returned position sufficient to enable the clutch to be closed.

60. In a typewriting machine, the combination with the carriage, of carriage return mechanism comprising a motor, a drive train from said motor to said carriage including a spring closed clutch, a latch normally holding said clutch open, a key for tripping said latch to allow the clutch to close, means whereby the return motion of the carriage opens said clutch, and means for preventing said key from tripping said latch until said clutch opening means shall have moved back far enough to allow the clutch to close properly when the latch is tripped.

61. In a typewriting machine, the combination with the carriage, of carriage return mechanism including a motor, a drive train from said motor to said carriage including a spring closed clutch, a latch normally holding said clutch open, a key to release said latch, a cam device acting during the latter part of the return movement of the carriage to open said clutch, and a lock held open by said cam device but normally adapted when said cam device is out of normal position to lock said latch against release.

62. In a typewriting machine, the combination with the carriage, of carriage return mechanism including a motor, a drive train from said motor to said carriage including a spring closed clutch, a latch normally holding said clutch open, a key to release said latch, a cam device acting during the latter part of the return movement of the carriage to open said clutch, and a lock normally held open by said cam device but adapted when said cam device is out of normal position to lock said latch against release, the connection from said key to said latch including a yielding part to prevent injury in case the key is operated while the latch is locked.

63. In a machine of the class described, the combination with typewriting mechanism including a carriage and computing mechanism including a universal member, of carriage return mechanism including a motor, a key and means operated by said key for bringing said motor into action to return the carriage; and an interlock between said universal member and said key operated means.

64. In a machine of the class described, the combination with typewriting mechanism including a carriage and computing mechanism including a universal member, of carriage return mechanism including a motor, a key and means operated by said key for bringing said motor into action to return the carriage, of an interlock between said universal member and said key operated means, and means adapted to yield in case said key is operated at a time when said interlock is in action.

65. In a machine of the class described, the combination with typewriting mechanism including a carriage and computing mechanism, of power operated carriage return mechanism including a motor, a key, a rock shaft having yielding connection with said key, and means operated by said rock shaft for bringing said motor into action, of a locking bar mounted on said rock shaft and adapted to lock said rock shaft in case the computing mechanism is in action and to lock said computing mechanism in case said rock shaft has been rocked by said key.

66. In a typewriting machine, the combination with the carriage, of a rod parallel with the travel of the carriage and adapted to be moved endwise by an abutment on said carriage, a motor normally inactive for returning said carriage, spring operated means for bringing said motor into action to return said carriage, a latch for said spring-operated means, and connections from said rod to operate said latch.

67. In a typewriting machine, the combination with the carriage, of a motor normally inactive for returning the carriage, spring-operated means for bringing said motor into action to return the carriage, a latch for said spring-operated means, two endwise movable rods parallel with the carriage, means whereby one of said rods is moved endwise at one end of the carriage travel and the other rod at the other end of the carriage travel, connections from the first said rod to said latch, and means whereby the second said rod restores said spring-operated means.

68. In a typewriting machine, the combination with the carriage, of a motor normally inactive for returning said carriage, spring-operated means for bringing said motor into action, a control unit, said spring-operated means having a part thereof extending into said unit, a latch in said unit acting on said part to maintain said spring-operated means in its inactive position, two abutments on said carriage, devices operated by said abutments one at one end of the carriage travel and the other at the other end of the carriage travel, and connections from said devices into said control unit for releasing said latch at one end of the carriage travel, and for restoring said spring operated means at the other end of the carriage travel.

69. In a typewriting machine, the combination with the carriage, of carriage return mechanism including a motor and a control unit, said control unit including mechanism adapted to control the action of said motor in returning the carriage, said mechanism including parts jointed together by means of pivots, each pivot having an elongated head, each of said pivots co-operating with a slotted part, the construction being such that the said elongated head holds the two parts in proper engagement but such that by turning one of said parts to an abnormal position by hand, the slotted part can be removed, the head passing through the slot.

70. In a typewriting machine, the combination with the carriage, of carriage return mechanism having a drive unit comprising a power train for driving the carriage to return it to initial position, and having also a control unit, a rock shaft journaled at one end in said drive unit and at the other end in said control unit, said rock shaft at its first said end having means to control a clutch comprised in said drive unit, and having at its other end a part extending into said control unit, means in said control unit acting on said part to cause said shaft to be rocked to close said clutch, other devices in said control unit acting on said part to rock said shaft to open said clutch, abutments on the carriage, and devices operated by said abutments and having connections into said control unit to operate the means for causing the clutch to be opened and closed.

Signed at the borough of Manhattan, city of New York, in the county of New York and State of New York, this 4th day of February, A. D. 1925.

FREDERICK A. HART.